US008542886B2

(12) United States Patent (10) Patent No.: US 8,542,886 B2
Osadchy et al. (45) Date of Patent: Sep. 24, 2013

(54) SYSTEM FOR SECURE FACE IDENTIFICATION (SCIFI) AND METHODS USEFUL IN CONJUNCTION THEREWITH

(75) Inventors: Margarita Osadchy, Haifa (IL); Binyamin Pinkas, Tel Aviv (IL); Ayman Jarrous, Shafa-amer (IL); Boaz Moskovich, Haifa (IL)

(73) Assignee: Carmel-Haifa University Economic Corporation Ltd., Haifa (IL)

( * ) Notice: Subject to any disclaimer, the term of this patent is extended or adjusted under 35 U.S.C. 154(b) by 631 days.

(21) Appl. No.: 12/828,906

(22) Filed: Jul. 1, 2010

(65) Prior Publication Data

US 2011/0026781 A1 Feb. 3, 2011

(30) Foreign Application Priority Data

Jul. 2, 2009 (IL) .......................................... 199657
Dec. 31, 2009 (IL) .......................................... 203066

(51) Int. Cl.
*G06K 9/00* (2006.01)
(52) U.S. Cl.
USPC ............................ 382/118; 382/180; 382/218
(58) Field of Classification Search
USPC .................................. 382/118, 209, 180, 218
See application file for complete search history.

(56) References Cited

U.S. PATENT DOCUMENTS

| 5,995,639 | A  | * | 11/1999 | Kado et al. ..................... 382/118 |
| 6,381,346 | B1 |   | 4/2002  | Eraslan |
| 6,563,950 | B1 | * | 5/2003  | Wiskott et al. ................. 382/209 |
| 8,306,316 | B2 | * | 11/2012 | Kameyama .................... 382/159 |
| 2003/0165267 | A1 | * | 9/2003 | Tamagawa ..................... 382/167 |

FOREIGN PATENT DOCUMENTS

WO   WO2008054865 A2   5/2008

OTHER PUBLICATIONS

Margarita Osadchy et al, SCiFI-A System for Secure Face Identification, May 16-19, 2010, 31st Symposium on Security and Privacy, pp. 1-16.*
Zhang, et al., "Local features and kernels for classification of texture and object categories: a comprehensive study", International Journal of Computer Vision, 73(2):213-238, 2006.
http://www.daimi.au.dk/~jurik/Research/Paillier/Cryptosystem/Cryptosystem.java.
"Secure Computation of Face Recognition".

(Continued)

*Primary Examiner* — Gregory M Desire
(74) *Attorney, Agent, or Firm* — The Law Office of Michael E. Kondoudis

(57) ABSTRACT

A method for privacy-retaining face identification comprising dividing at least one input face into a first set of patches, providing an assortment of patch profiles for each patch in the first set of patches, each patch profile in the assortment being associated with a unique index thereby to define an assortment of unique indices, for each individual patch in the input face, finding at least one patch profile within the assortment of patch profiles which most resembles the individual patch, thereby to define a first set of indices from among the assortment of unique indices whose corresponding patch profiles most resemble the input face's patches respectively, and using a privacy preserving computation to generate a physical output indicative of a comparison of the input face and at least one target face by comparing first and second functions of the first set of indices and of a second set of indices respectively, the second set of indices corresponding to patch profiles which most resemble a second set of patches into which the target face has been divided.

23 Claims, 9 Drawing Sheets

(56) References Cited

OTHER PUBLICATIONS

"Robust, illumination invariant face recognition with built-in privacy protection", Anonymous ICCV submission, paper ID 579, pp. 1-8, 2009.
American Civil Liberties Union, "What's wrong with public video surveillance?", pp. 1-4, Feb. 2002.
Adini, et al., "Face recognition: the problem of compensating for changes in illumination direction", Department of Applied Mathematics and Computer Science, 19(7):721-732, 1997.
Arlazarov, et al., "On economical construction of the transitive closure of an oriented graph", Soviet Math. Dokl, vol. 11, p. 85, 1970.
Avidan, et al., "Blind vision", A. Leonardis, H. Bischof, and A. Pinz, (Eds.), ECCV, vol. 3953 of Lecture Notes in Computer Science, pp. 1-13, 2006.
Bicego, et al., "On the use of sift features for face authentication", Proc. of IEEE Int Workshop on Biometrics, in association with CVPR, 2006.
Boult, T., "Pico: Privacy through invertible cryptographic obscuration", Computer Vision for Interactive and Intelligent Environment, pp. 27-38, 2005.
Boult, T., "Robust distance measures for face-recognition supporting revocable biometric tokens", IEEE, 7th Intl. Conf. on Automatic Face and Gesture Recognition, pp. 560-566, 2006.
Boyen, et al., "Secure remote authentication using biometric data", Eurocrypt, May 2005.
Chang, et al., "Biometrics-based cryptographic key generation", ICME, pp. 2203-2206, 2004.
Chen, et al., "Multi-bits biometric string generation based on the likelihood ratio", IEEE Conf. on Biometrics: Theory, Applications and Systems, 2007.
Chen, et al., "Biometric binary string generation with detection rate optimized bit allocation", CVPR Workshop on Biometrics, pp. 1-7, 2008.
Dodis, et al., "Fuzzy extractors: How to generate strong keys from biometrics and other noisy data", Eurocrypt, 2004.
Dodis, et al., "Correcting errors without leaking partial information", STOC, 2005.
Dufaux, et al., "Scrambling for Video Surveillance with Privacy", IEEE Workshop on Privacy Research in Vision, Lecture Notes in Computer Science. IEEE, 2006.
Erkin, et al., "Privacy-preserving face recognition", Proc. of the 9th International Symposium on Privacy Enhancing Technologies (PET), p. 253. Springer, 2009.
Goldreich, O., "Foundations of Cryptography: vol. 2, Basic Applications", Cambridge University Press, New York, NY, USA, 2004.
Gourier, et al., "Facial features detection robust to pose, illumination and identity", Int'l Conf. on Systems Man and Cybernetics, 2004.
Heisele, et al., "A component-based framework for face detection and identification", IJCV, 74(2):167-181, 2007.
Jarrous, et al., "Secure hamming distance based computation and its applications", (ACNS), 2009.
Juels, et al., "A fuzzy vault scheme", Symposium on Information Theory, 2002.
Juels, et al., "A fuzzy commitment scheme", ACM Computers and Communication Security conference, 1999.
Kevenaar, et al., "Face recognition with renewable and privacy preserving binary templates", IEEE Workshop on Automatic Identification Advanced Technologies, pp. 21-26, 2005.
Lades, et al., "Distortion invariant object recognition in the dynamic link architecture", IEEE Transactions on Computers, 42:300-311, 1993.
Li, et al. "Robust part-based face recognition using boosting and transduction", Biometrics: Theory, Applications, and System. First IEEE International Conference on, pp. 1-5, 2007.
Gross, et al., "Face Recognition Across Pose and Illumination", Springer-Verlag, Jun. 2004.
Lowe, D.G., "Distinctive image features from scale-invariant keypoints", IJCV, 60(2):91-110, 2004.
Lucey, et al., "Learning patch dependencies for improved pose mismatched face verification", CVPR, 2006.
Luo, et al., "Person-specific sift features for face recognition", ICASSP 2007, pp. II-593-II-596, 2007.
Naor, et al., "Computationally secure oblivious transfer", J. Cryptology, 18(1):1-35, 2005.
Newton, et al., "Preserving privacy by de-identifying face images", IEEE Trans. On Knowl. and Data Eng., 17 (2):232-243, 2005.
Osadchy, et al., "Synergistic face detection and pose estimation with energy-based models", Journal of Machine Learning Research, 8:1197-1215, May 2007.
Paillier, P., "Public-key cryptosystems based on composite degree residuosity classes", EUROCRYPT, pp. 223-238, 1999.
Phillips, et al., "The feret evaluation methodology for face-recognition algorithms," PAMI, 22(10):1090-1104, 2000.
Ratha, et al., "Generating cancelable fingerprint templates", PAMI, 29(4):561-572, 2007.
Sadeghi, et al., "Efficient Privacy-Preserving Face Recognition", 12th International Conference on Information Security and Cryptology (ICISCâ€™ 09), LNCS. Springer, 2009.
Schiff, et al., "Respectful cameras: Detecting visual markers in real-time to address privacy concerns", International Conference on Intelligent Robots and Systems (IROS), pp. 971-978, 2007.
Senior, et al., "Enabling video privacy through computer vision", IEEE Security and Privacy, 3(3):50-57, 2005.
Sim, et al., "The cmu pose, illumination, and expression database", PAMI, 25:1615-1618, 2003.
Turk, et al., "Eigenfaces for recognition", Journal of Cognitive Neuroscience, 3(1):71-86, 1991.
Tuyls, et al., "Practical biometric authentication with template protection", AVBPA, pp. 436-446, 2005.
Tuyls, et al., "Capacity and examples of template-protecting biometric authentication systems", ECCV Workshop . BioAW, 2004.
Vetro, et al., "Distributed Source Coding, chapter Securing Biometric Data", Elsevier, 2009.
Viola, et al., "Rapid object detection using a boosted cascade of simple features", Proceedings IEEE Conf. on Computer Vision and Pattern Recognition, pp. 511-518, 2001.
Wiskott, et al., "Face recognition by elastic bunch graph matching", PAMI, 19(7):775-779, 1997.
Yao, A., "How to generate and exchange secrets", Proceedings of the 27th Symposium on Foundations of Computer Science, pp. 162-167, 1986.
Yuen, et al., "Automatic detection of face and facial features", ISPRA'08, pp. 230-234, 2008.
Zhao, et al., "Face recognition: A literature survey", ACM Computing Surveys, pp. 399-458, 2003.
Zhou, et al., "Appearance characterization of linear lambertian objects, generalized photometric stereo, and illumination-invariant face recognition", PAMI, 29(2):230-245, 2007.
Zhou, et al., "Nearest-subspace patch matching for face recognition under varying pose and illumination", FG, pp. 1-8, 2008.
Erkin, et al., "Privacy-Preserving Face Recognition", Privacy Enhancing Technologies conference (PET) 2009, pp. 235-253.

\* cited by examiner

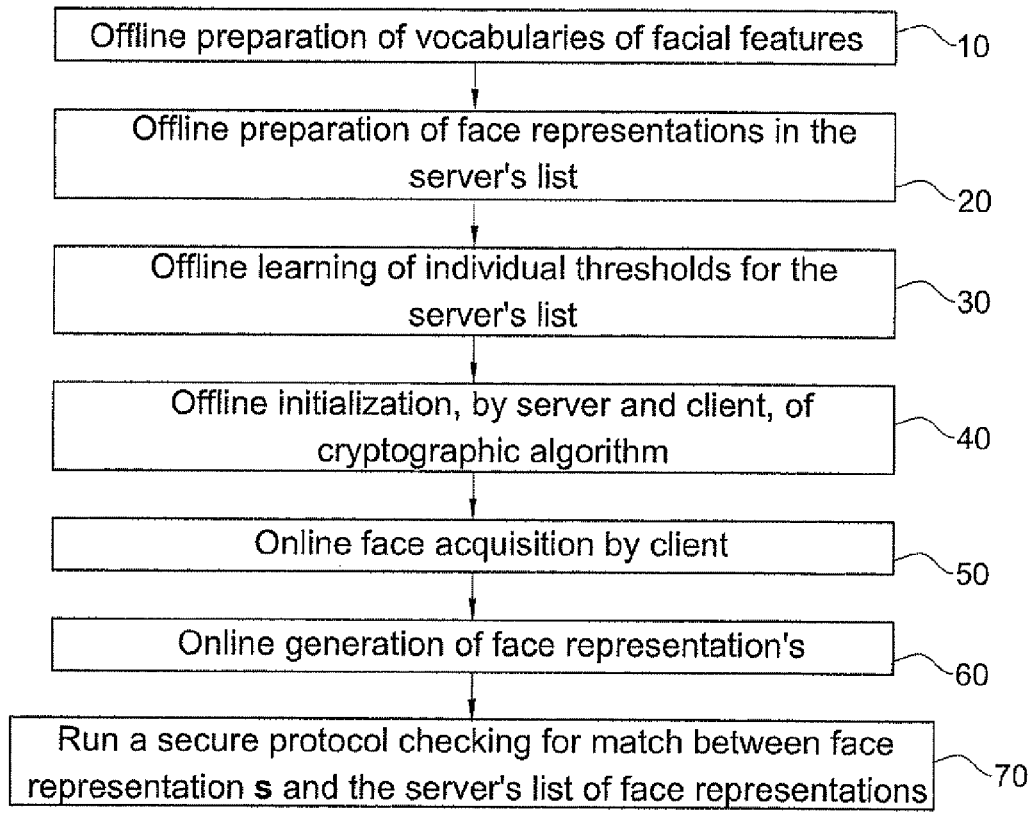

100: Provide client and server input. Client's input may comprise a binary word w=(w0,...,wl-1). server's input may comprise a list (database) of N binary words, w1,...,wN, where $\omega_0^i,...,(\omega_{l-1}^i)$ and additional inputs $t_1,...,t_N$, which are thresholds associated with each database word. Both client and server know an upper bound dmax on the Hamming distance between two words. In general, $d_{max}=l$; in certain applications dmax ≤ 180.

110: The client sends the homomorphic encryption of each bit of the binary representation of $\omega = \omega_0,...,w_{l-1}$.

120: The server receives the encrypted representation { $E_{pk}(\omega_0),...,E_{pk}(\omega_{l-1})$ }.

130: repeat steps 140 – 180 for each database item $w^i \in \{w^1,...,w^N\}$ :

140: For each bit location j the server computes $E_{pk}(v_j)$, where $v_j = \omega_j \oplus \omega_j^i$, e.g. as follows:
$E_{pk}(v_j) = E_{pk}(\omega_j) \cdot_{pk} (1-\omega_j^i) +_{pk} (1 -_{pk} E_{pk}(\omega_j)) \cdot_{pk} \omega_j^i$.

To Fig. 3B step 150

Fig. 3A

| Occluded Part | Recognition rate for 15% false positives | No. of occluded parts |
|---|---|---|
| Left eye | 89% | 10/30 |
| Mouth | 91.5% | 4/30 |
| Nose | 92.8% | 3/30 |

SYSTEM FOR SECURE FACE IDENTIFICATION (SCIFI) AND METHODS USEFUL IN CONJUNCTION THEREWITH

REFERENCE TO CO-PENDING APPLICATIONS

Priority is claimed from Israel Patent Application No. 199657 entitled "Face representation systems for privacy aware applications and methods useful in conjunction therewith" and filed 2 Jul. 2009. Priority is also claimed from Israel Application No. 203066 filed on Dec. 31, 2009.

FIELD OF THE INVENTION

The present invention relates generally to image processing and more particularly to face identification.

BACKGROUND OF THE INVENTION

Conventional technology pertaining to certain embodiments of the present invention is described in the following publications inter alia:

[1] ACLU. What's wrong with public video surveillance?, 2002.
[2] Y. Adini, Y. Moses, and S. Ullman. Face recognition: the problem of compensating for changes in illumination direction. PAMI, 19(7):721-732, 1997.
[3] V. Arlazarov, E. Dinic, M. Kronrod, and I. Faradzev. On economical construction of the transitive closure of an oriented graph. In Soviet Math. Dokl, volume 11, page 85, 1970.
[4] S. Avidan and M. Butman. Blind vision. In A. Leonardis, H. Bischof, and A. Pinz, editors, ECCV (3), volume 3953 of Lecture Notes in Computer Science, pages 1-13. Springer, 2006.
[5] M. Bicego, A. Lagorio, E. Grosso, and M. Tistarelli. On the use of sift features for face authentication. In Proc. of IEEE Int Workshop on Biometrics, in association with CVPR, 2006.
[6] T. Boult. Pico: Privacy through invertible cryptographic obscuration. Computer Vision for Interactive and Intelligent Environment, 2005, pages 27-38, 2005.
[7] T. Boult. Robust distance measures for face-recognition supporting revocable biometric tokens. In IEEE, 7th Intl. Conf. on Automatic Face and Gesture Recognition, pages 560-566, 2006.
[8] X. Boyen, a. J. K. Y. Dodis, R. Ostrovsky, and A. Smith. Secure remote authentication using biometric data. In Eurocrypt, May 2005.
[9] Y. Chang, W. Zhang, and T. Chen. Biometrics-based cryptographic key generation. In ICME, pages 2203-2206, 2004.
[10] C. Chen, R. Veldhuis, T. Kevenaar, and A. Akkermans. Multi-bits biometric string generation based on the likelihood ratio. In IEEE Conf. on Biometrics: Theory, Applications and Systems, 2007.
[11] C. Chen, R. Veldhuis, T. Kevenaar, and A. Akkermans. Biometric binary string generation with detection rate optimized bit allocation. In CVPR Workshop on Biometrics, pages 1-7, 2008.
[12] Y. Dodis, L. Reyzin, and A. Smith. Fuzzy extractors: How to generate strong keys from biometrics and other noisy data. In Eurocrypt, 2004.
[13] Y. Dodis and A. Smith. Correcting errors without leaking partial information. In STOC, 2005.
[14] Dufaux and T. Ebrahimi. Scrambling for Video Surveillance with Privacy. In IEEE Workshop on Privacy Research in Vision, Lecture Notes in Computer Science. IEEE, 2006.
[15] Z. Erkin, M. Franz, J. Guajardo, S. Katzenbeisser, I. Lagendijk, and T. Toft. Privacy-preserving face recognition. In Proc. of the 9th International Symposium on Privacy Enhancing Technologies (PET), page 253. Springer, 2009.
[16] O. Goldreich. Foundations of Cryptography: Volume 2, Basic Applications. Cambridge University Press, New York, N.Y., USA, 2004.
[17] N. Gourier, D. Hall, and J. L. Crowley. Facial features detection robust to pose, illumination and identity. In Intl Conf. on Systems Man and Cybernetics, 2004.
[18] B. Heisele, T. Serre, and T. Poggio. A component-based framework for face detection and identification. IJCV, 74(2):167-181, 2007.
[19] A. Jarrous and B. Pinkas. Secure hamming distance based computation and its applications. In (ACNS), 2009.
[20] A. Juels and M. Sudan. A fuzzy vault scheme. In Symposium on Information Theory, 2002.
[21] A. Juels and M. Wattenberg. A fuzzy commitment scheme. In ACM Computers and Communication Security conference, 1999.
[22] T. Kevenaar, G. Schrijen, M. Veen, A. Akkermans, and F. Zuo. Face recognition with renewable and privacy preserving binary templates. In IEEE Workshop on Automatic Identification Advanced Technologies, pages 21-26, 2005.
[23] M. Lades, J. C. Vortbrtiggen, J. Buhmann, J. Lange, R. P. W. C. von der Malsburg, and W. Konen. Distortion invariant object recognition in the dynamic link architecture. IEEE Transactions on Computers, 42:300-311, 1993.
[24] F. Li and H. Wechsler. Robust part-based face recognition using boosting and transduction. In Biometrics: Theory, Applications, and Systems. First IEEE International Conference on, pages 1-5, 2007.
[25] S. Z. Li and A. K. Jain, editors, Face Recognition Across Pose and Illumination. Springer-Verlag, June 2004.
[26] D. G. Lowe. Distinctive image features from scale-invariant keypoints. IJCV, 60(2):91-110, 2004.
[27] S. Lucey and T. Chen. Learning patch dependencies for improved pose mismatched face verification. In CVPR, 2006.
[28] J. Luo, Y. Ma, E. Takikawa, S. Lao, M. Kawade, and B. Lu. Person-specific sift features for face recognition. In ICASSP 2007, pages 11-593-11-596, 2007.
[29] M. Naor and B. Pinkas. Computationally secure oblivious transfer. J. Cryptology, 18(1):1-35, 2005.
[30] E. M. Newton, L. Sweeney, and B. Malin. Preserving privacy by de-identifying face images. IEEE Trans. on Knowl. and Data Eng., 17(2):232-243, 2005.
[31] M. Osadchy, Y. LeCun, and M. Miller. Synergistic face detection and pose estimation with energy-based models. Journal of Machine Learning Research, 8:11.97-1215, May 2007.
[32] P. Paillier. Public-key cryptosystems based on composite degree residuosity classes. In EUROCRPT, pages 223-238, 1999.
[33] P. J. Phillips, H. Moon, S. A. Rizvi, and P. J. Rauss. The feret evaluation methodology for face-recognition algorithms. PAMI, 22(10):1090-1104, 2000.
[34] N. K. Ratha, S. Chikkerur, J. H. Connell, and R. M. Bolle. Generating cancelable fingerprint templates. PAMI, 29(4): 561-572, 2007.
[35] A. Sadeghi, T. Schneider, and I. Wehrenberg. Efficient Privacy-Preserving Face Recognition. In 12th International Conference on Information Security and Cryptology (ICISC'09), LNCS. Springer, 2009.

[36] J. Schiff, M. Meingast, D. Mulligan, S. Sastry, and K. Goldberg. Respectful cameras: Detecting visual markers in real-time to address privacy concerns. In International Conference on Intelligent Robots and Systems (IROS), pages 971-978, 2007.

[37] A. Senior, S. Pankanti, A. Hampapur, L. Brown, Y.-L. Tian, A. Ekin, J. Connell, C. F. Shu, and M. Lu. Enabling video privacy through computer vision. IEEE Security and Privacy, 3(3):50-57, 2005.

[38] T. Sim, S. Baker, and M. Bsat. The cmu pose, illumination, and expression database. PAMI, 25:1615-1618, 2003.

[39] M. Turk and A. Pentland. Eigenfaces for recognition. Journal of Cognitive Neuroscience, 3(1):71-86, 1991.

[40] P. Tuyls, A. Akkermans, T. Kevenaar, G. Schrijen, A. Bazen, and R. Veldhuis. Practical biometric authentication with template protection. In AVBPA, pages 436-446, 2005.

[41] P. Tuyls and J. Goseling. Capacity and examples of template-protecting biometric authentication systems. In ECCV Workshop BioAW, 2004.

[42] A. Vetro, S. Draper, S. Rane, and J. Yedidia. Distributed Source Coding, chapter Securing Biometric Data. Elsevier, 2009.

[43] P. Viola and M. Jones. Rapid object detection using a boosted cascade of simple features. In Proceedings IEEE Conf. on Computer Vision and Pattern Recognition, pages 511-518, 2001.

[44] L. Wiskott, J.-M. Fellous, N. Kruger, and C. von der Malsburg. Face recognition by elastic bunch graph matching. PAMI, 19(7):775-779, 1997.

[45] A. Xao. How to generate and exchange secrets. In Proceedings of the 27th Symposium on Foundations of Computer Science, pages 162-167, 1986.

[46] C. T. Yuen, M. Rizon, W. S. San, and M. Sugisaka. Automatic detection of face and facial features. In ISPRA'08, pages 230-234, 2008.

[47] W. Zhao, R. Chellappa, A. Rosenfeld, and P. Phillips. Face recognition: A literature survey. ACM Computing Surveys, pages 399-458, 2003.

[48] S. K. Zhou, G. Aggarwal, R. Chellappa, and D. Jacobs. Appearance characterization of linear lambertian objects, generalized photometric stereo, and illumination-invariant face recognition. PAMI, 29(2):230-245, 2007.

[49] Z. Zhou, A. Ganesh, J. Wright, S. Tsai, and Y. Ma. Nearest-subspace patch matching for face recognition under varying pose and illumination. In FG, pages 1-8, 2008.

[50] Zekeriya Erkin, Martin Franz, Jorge Guajardo, Stefan Katzenbeisser, Inald Lagendijk, Tomas Toft: "Privacy-Preserving Face Recognition". Privacy Enhancing Technologies conference (PET) 2009. pp. 235-253.

[51] Local features and kernels for classification of texture and object categories: a comprehensive study. J. Zhang, M. Marszalek, S. Lazebnik and C. Schmid. International Journal of Computer Vision, 73(2):213-238, 2007.

References to the above documents in the present specification are enclosed in square brackets and use the numbering above.

The disclosures of all publications and patent documents mentioned in the specification, and of the publications and patent documents cited therein directly or indirectly, are hereby incorporated by reference.

SUMMARY OF THE INVENTION

Certain embodiments of SCiFI, a system for Secure Computation of Face Identification, are now described. The term "SCiFI" as used herein refers to any or all of such embodiments. Certain embodiments of the system perform face identification which compares faces of subjects with a database of registered faces. The identification is done in a secure way which protects both the privacy of the subjects and the confidentiality of the database. A specific application of SCiFI is reducing the privacy impact of camera based surveillance. In that scenario, SCiFI would be used in a setting which contains a server which has a set of faces of suspects, and client machines which might be cameras acquiring images in public places. The system runs a secure computation of a face recognition method, which identifies if an image acquired by a client matches one of the suspects, but otherwise reveals no information to neither of the parties.

Certain embodiments of the present invention seek to provide a new face identification method which is suitable for usage in secure computation. Nonetheless, the method has face recognition performance comparable to that of state of the art algorithms. Experiments show the method to be robust to different viewing conditions, such as illumination, occlusions, and changes in appearance, like wearing glasses.

Certain embodiments of the present invention seek to provide a secure protocol for computing the new face recognition method. In addition, it is preferable to optimize the protocol and minimize its online latency.

Certain embodiments of the present invention seek to provide a SCiFI system which implements a secure computation of the face identification protocol.

Experiments show that the entire system can run in near real-time: The secure computation protocol performs a preprocessing of all public-key cryptographic operations. Its online performance therefore typically depends mainly on the speed of data communication, and experiments performed show it to be extremely efficient.

Video and camera based surveillance is very common, and is found to be useful for fighting crime. On the other hand, the ubiquity of such surveillance is a major concern for the public, that feels that its privacy is being violated e.g. as per the ACLU's report on this subject [1]. Face recognition systems can automatically identify if some known suspects appear in a large set of images. Such systems can be useful, for example, for automatically searching for suspects in a stream of images coming from public places. On the other hand, these systems can be misused to track people regardless of suspicion, and a rogue operator can even combine it with a universal database linking faces to identities, such as a database of drivers' license photos.

Optionally, each camera may be provided with the list of images of suspects, perform the identification task locally at the camera, and report to the operator only in the rare cases where a match is found. This solution might not be acceptable, though, if the list of suspects is confidential, as is often the case. There is therefore a need for a solution which protects both the privacy of the public and the confidentiality of the data held by authorities. Certain embodiments of the SCiFI system match images taken by a client camera to a list of images e.g. of potential suspects which are held by a server. Face identification in SCiFI is based on a novel face recognition method that performs very well in terms of applicability to real-life images and robustness to unseen conditions e.g., images taken under different illumination conditions. The matching is done in a privacy preserving way, using efficient methods of secure computation, and does not reveal any information to the parties, except for whether a match was found. Furthermore, to further protect the database of suspects it is possible to distribute the operation of the server to run on several machines, such that each of these machines knows only part of each suspect's face. Denote this system as dSCiFI. The overhead of dSCiFI is only negligibly higher than that of certain basic SCiFI systems.

SCiFI typically resides in a server, which stores a set of face representations of subjects from a confidential list, and a client, whose input is a single face. In a typical setting the server might have a list of faces of suspected persons, while the client might be a camera which takes photos of passersby. The recognition module of the client typically receives images of faces preprocessed for face recognition. Methods for face detection or localization that perform this preprocessing are known in the art and are described e.g. in references [31, 43]. The face detection methods described in these references are known e.g. in conventional digital cameras, and compute a bounding box containing a face, given an image of a face. The system is operative to find out if the face held by the client matches any of the faces in the server's list. As with any biometric data, it is unlikely that there will be an exact match between the image acquired by the client and the image of the same person that exists in the list. Therefore a fuzzy matching face identification method is typically used. The matching is done in a privacy preserving manner in that the server and client typically do not learn any information except for whether there is a match between the client's input and a face in the server's list.

The face recognition methods shown and described herein have good performance in terms of robustness of recognition, and can also support secure computation protocols. Face recognition algorithms typically use data representations over the Real numbers, whereas secure protocols operate over finite fields, and a simple conversion of existing face recognition methods to finite fields results in degradation of recognition. Secure protocols, based on homomorphic encryption and oblivious transfer, computing the face recognition method are described herein. Experiments were conducted showing the accuracy of the face recognition method and the nearly real-time performance of the secure protocols.

Face recognition is an inexpensive and non-intrusive technique, and its usage for user verification is more convenient than using passwords, hardware devices, or other biometric identification methods. Thus previous research in incorporating face technology with security focused on the verification task [40, 10, 9, 11, 22] where the user identifies himself to the system and the system verifies his identity by comparing the current image of his face with a representation of his face stored in the system. Such applications assume a controlled environment, rely on user's cooperation, and usually use several images of a person under controlled conditions in the registration phase.

A different recognition task is denoted in the face recognition literature as identification. This is a one-to-many recognition task where a single image is compared with a list of stored images. This task is more useful in surveillance applications, like the detection of criminals or terrorists in public places, or a search for a missing person. It has several distinguishing characteristics which make it much harder to implement than the verification task:

The registration of persons into the system is based on very few images of them, usually a single image per person, which might have been taken without the person's cooperation, under arbitrary conditions of illumination and pose, and might be of poor quality.

The recognition routine is also different: Given a novel image of a face under arbitrary, and not necessarily ideal, viewing conditions, the system recognizes if this is an image of one of the individuals stored in the system or otherwise rejects it.

In addition, unlike the one-to-one verification task, the one-to-many identification task, which is done without the subject's cooperation, is preferably robust to different changes that are likely to occur between the original picture stored in the database, and the image taken by the client camera. These can include, for example, some or all of:

Changes in illumination, i.e. in the amount and direction of light.

Changes in the viewpoint of the camera, and in the pose of the subject.

Different occlusions which hide parts of the subject's face.

Difference in facial expressions.

Changes in local appearance due to facial hair, makeup, glasses, etc., which might be used by the suspect to avoid being identified. In general, analysis of test images indicates variation therebetween e.g. illumination direction, personal changes such as spectacles being on/off, variation in pose, lighting and facial expression, and so forth.

As with any biometric data, two images of the same person are never identical. On the other hand, authentication based on passwords or cryptographic keys always expects the user to enter the same password or use the same key. Representations used in recognition are typically designed to produce the same results for similar, but not necessarily identical, inputs. In cryptographic algorithms only identical inputs enable successful authentication, and therefore they cannot be applied to biometric recognition. To bridge this gap, there have been attempts in cryptography to develop noise resistant one-way hash functions [21, 20, 41, 12, 8, 13] as described in detail below.

A classic face recognition method is the Eigenfaces algorithm which is known, however, to have poor robustness with respect to the requirements listed above for the identification task. This property is particularly true if only a single image, of a few similar images, are available for the purpose of registering a person in the database. The Eigenfaces algorithm is therefore not suitable for face identification under changes of viewing conditions.

The methods used by certain embodiments of SCiFI performs well in the one-to-many identification task since it can generalize to unseen conditions. There are other face recognition algorithms which are robust to changes in the environment in which photos are taken. The method of SCiFI is unique, however, in that it lends itself easily to secure computation, which is inherently based on the usage of discrete mathematics. Other effective face recognition algorithms employ continuous face representations which are compared by complex measures of similarity that in some cases are not even metric. Such representations are not easily supported by cryptographic algorithms. A naive conversion from the continuous comparison methods used in face recognition to a discrete measure, using, e.g., simple quantization, affects the accuracy of recognition, and result in degraded performance.

Typically, the system includes a server and a client. The operation of the system can be separated into an offline or "preprocessing" part, and an online part. The offline part prepares the face recognition database, by computing representations of the faces that are in the server's list. This stage is also used to execute some initializations and preprocessing of the cryptographic algorithms.

The online part is executed after the client obtains an image. This part decides whether the image is of a person who appears in the list, and can be separated into two distinct stages. In the first stage the client prepares a representation of the face that it acquired. In the second stage the two parties execute a cryptographic method which compares the client's representation with those in the server's list, and decides whether there is a match between them typically without revealing any other information.

It is appreciated that any operation described herein as being executed in the offline part, can also be executed in the online part, e.g. after the client obtains its input image.

According to certain embodiments of the present invention, a distributed system is provided where the role of the server is distributed between m different machines. It is assumed that one entity has the database of suspect faces, but it does wish to store this database on any single machine which is connected to an external network, for fear of attacks that might compromise it. Therefore each of the m server machines stores part of the database, so that breaking into any subset of these m machines reveals only partial information about any of the faces. The client then interacts with the m machines, and at the end of the protocol the required output is computed. A preferred mode of operation is where no interaction or synchronization is required between the server machines, but rather each one of them can separately interact with the client.

According to certain embodiments of the present invention, a client such as, for example, a bank, encodes each input face arriving at a secured location in the bank, thereby to generate an encoded input face that can undergo homomorphic encryption, A homomorphic encryption of the encoded input face is generated and sent to the server side which may comprise a governmental agency or a trusted third party.

According to certain embodiments of the present invention, a database of patch profiles is previously constructed, which may be aggregated from many people's faces whose privacy need not be maintained. Typically there is a set of patch profiles for each facial feature of portion of a face such as eyes, mouth, nose, chin. Each patch profile is uniquely indexed e.g. by defining a first index uniquely identifying each facial feature/portion and an additional second index uniquely identifying each patch profile for that facial feature or portion of the face, Each patch profile may then be uniquely index by concatenating the first and second indices, for example. This database is typically accessible to both client and server and may be public.

There is thus provided, in accordance with at least one embodiment of the present invention, a method for privacy-retaining face identification comprising dividing at least one input face into a first set of patches, providing an assortment of patch profiles for each patch in the first set of patches, each patch profile in the assortment being associated with a unique index thereby to define an assortment of unique indices, for each individual patch in the input face, finding at least one patch profile within the assortment of patch profiles which most resembles the individual patch, thereby to define a first set of indices from among the assortment of unique indices whose corresponding patch profiles most resemble the input face's patches respectively, and using a privacy preserving computation to generate a physical output indicative of a comparison of the input face and at least one target face by comparing first and second functions of the first set of indices and of a second set of indices respectively, the second set of indices corresponding to patch profiles which most resemble a second set of patches into which the target face has been divided.

Further in accordance with at least one embodiment of the present invention, the method also comprises dividing at least one target face into a second set of patches; for each individual patch in the target face, and finding at least one patch profile within the assortment of patch profiles which most resembles the individual patch, thereby to define the second set of indices from among the assortment of unique indices whose corresponding patch profiles most resemble the target face's patches respectively.

Further in accordance with at least one embodiment of the present invention, a server processor having a library of at least one target face to be identified divides the target face into the second set of patches and defines the second set of indices and a client processor divides the input face into the second set of patches and defines the second set of indices.

Still further in accordance with at least one embodiment of the present invention, the respective functions comprise binary strings generated from the first and second sets of indices respectively and wherein a Hamming distance is used to compare the binary strings.

Additionally in accordance with at least one embodiment of the present invention, the assortment of patch profiles comprises a finite assortment.

Further in accordance with at least one embodiment of the present invention, the assortment of patch profiles for each patch in the first and second sets of patches comprises a public database available to the server processor and to the client processor.

Additionally in accordance with at least one embodiment of the present invention, using includes performing the privacy preserving computation without conveying any information regarding the input face, other than a function of the first set of indices, from the client processor to the server processor.

Further in accordance with at least one embodiment of the present invention, using includes performing the privacy preserving computation without conveying any information regarding the input face, other than a function of the second set of indices, from the server processor to the client processor.

Still in accordance with at least one embodiment of the present invention, the method also comprises computing a first binary string representing the first set of indices which includes a "1" at each position within the binary string which corresponds to an index in the first set of indices and a "0" at each position within the binary string which does not correspond to any index in the first set of indices.

Further in accordance with at least one embodiment of the present invention, the method also comprises computing a second binary string representing the second set of indices which includes a "1" at each position within the second binary string which corresponds to an index in the second set of indices and a "0" at each position within the second binary string which does not correspond to any index in the second set of indices.

Further in accordance with at least one embodiment of the present invention, the function of the first set of indices comprises a homomorphic encryption of the first binary string.

Still further in accordance with at least one embodiment of the present invention, the function of the second set of indices comprises a homomorphic encryption of the second binary string.

Additionally in accordance with at least one embodiment of the present invention, using the privacy preserving computation comprises determining similarity between the first and second functions of the first and second sets of indices respectively at least partly based on a determination of whether the number of individual bit differences in at least respective portions of respective binary strings representing the functions is less than a certain threshold.

Further in accordance with at least one embodiment of the present invention, the finding of at least one patch profile does not divulge any information other than whether or not the input face matches the target face.

Still further in accordance with at least one embodiment of the present invention, the method determines whether the at least one input face matches the at least one target face without divulging the input face to the server and without divulging the target face to the client.

Further in accordance with at least one embodiment of the present invention, only one of the server processors and the client processors learns whether or not the at least one input face matches the at least one target face.

Still further in accordance with at least one embodiment of the present invention, the method also comprises computing at least one binary string representing at least one set of indices from among the first and second sets of indices, which binary string includes a "1" at each position within the binary string which corresponds to an index in the at least one set of indices and a "0" at each position within the binary string which does not correspond to any index in the at least one set of indices.

Still further in accordance with at least one embodiment of the present invention, the physical output comprises a command affecting access to a restricted area.

Yet further in accordance with at least one embodiment of the present invention, the physical output comprises an output on a computerized display.

Further in accordance with at least one embodiment of the present invention, the method also comprises imaging a human's face to obtain a computerized representation of at least one face.

Additionally in accordance with at least one embodiment of the present invention, the first and second functions both comprise the unity function such that the privacy preserving computation compares the first set of indices to the second set of indices.

Also provided, in accordance with at least one embodiment of the present invention, is a system for privacy-retaining face identification operative in association with a server side having a library of at least one target face to be identified and a client side having at least one input face whose resemblance to the at least one target face is to be determined, the system including at least one face patcher dividing the input face into a first set of patches and dividing the target face into a second set of patches; a database including an assortment of patch profiles for each patch in the first and second sets of patches, each patch profile in the assortment being associated with a unique index thereby to define an assortment of unique indices; a discrete face analyzer finding, for each individual patch in the input face and in the target face, at least one patch profile within the assortment of patch profiles which most resembles the individual patch, thereby to define a first set of indices from among the assortment of unique indices whose corresponding patch profiles most resemble the input face's patches respectively and a second set of indices whose corresponding patch profiles most resemble the target face's patches respectively; and a privacy preserving computation machine operative to compare first and second functions of the first and second sets of indices respectively.

Also provided is a computer program product, comprising a computer usable medium or computer readable storage medium, typically tangible, having a computer readable program code embodied therein, the computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein may be performed by a conventional personal computer processor, workstation or other programmable device or computer or electronic computing device, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may whereever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

BRIEF DESCRIPTION OF THE DRAWINGS

Certain embodiments of the present invention are illustrated in the following drawings:

FIG. 1B is a simplified flowchart illustration of a method of operation for the system of FIG. 1A, according to certain embodiments of the present invention.

FIG. 1C summarizes the steps of FIG. 1B in table form.

FIGS. 3A-3B, taken together, form a simplified flowchart illustration of a first method for performing the secure face matching step in the method of FIG. 1B, not including security features, and characterized in that the output becomes known only to the client, all according to certain embodiments of the present invention.

DETAILED DESCRIPTION OF CERTAIN EMBODIMENTS

Figure 1A:
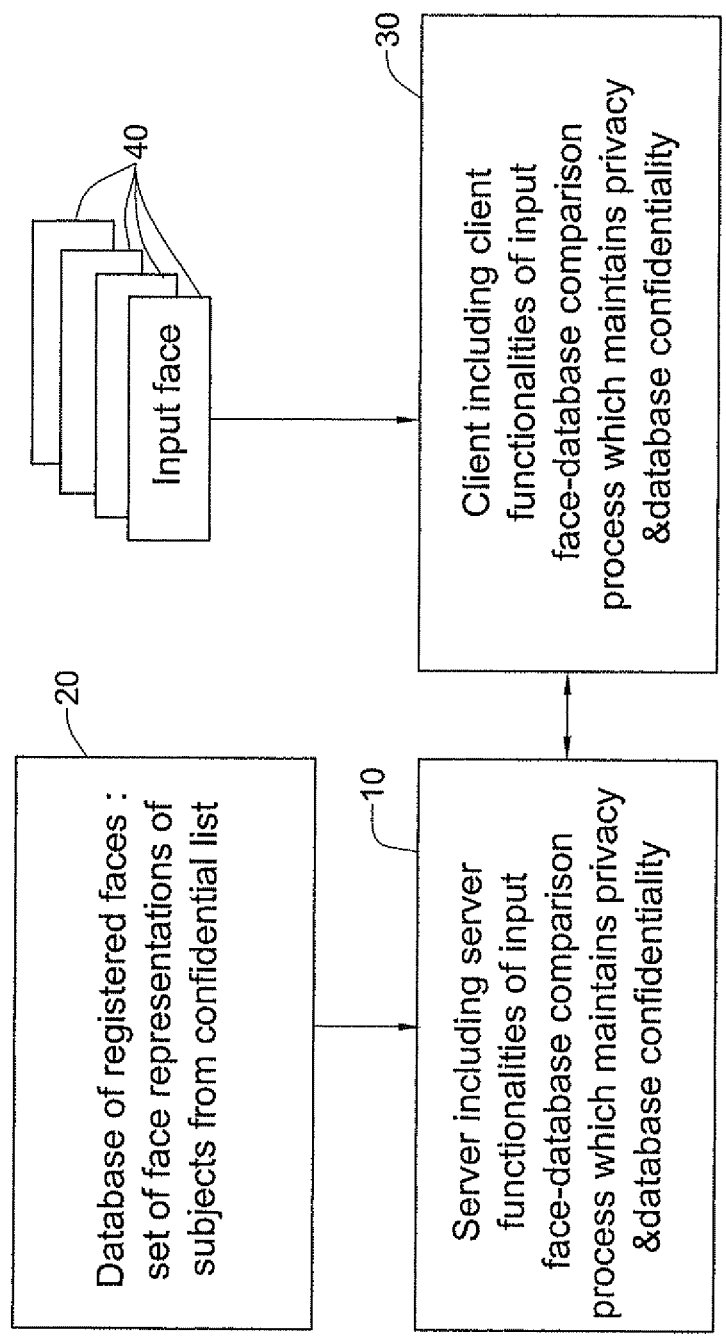
FIG. 1A is a top-level functional block diagram of a secure face recognition system constructed and operative in accordance with certain embodiments of the present invention.

Reference is now made to FIG. 1A, which is a top-level functional block diagram of a secure face recognition system constructed and operative in accordance with certain embodiments of the present invention. FIG. 1B is a simplified flowchart illustration of a method of operation for the system of FIG. 1A, according to certain embodiments of the present invention. FIG. 1C summarizes the steps of FIG. 1B in table form.

Typically, an index-based face representation is used that is suited for usage with secure computation, and yet has properties which make it very attractive for usage in a surveillance setting in which there is no cooperation by the targeted persons. The representation is typically based on only a single known image per person. It is robust to illumination changes, occlusions, shadows, highlights, and local changes in appearance such as wearing glasses. The representation is based on the idea of facial composite or "photo-robot", where a face is formed as a collection of fragments taken from vocabularies of facial features. A system sharing certain aspects of this technology is typically used by police departments to record an eyewitness's memory of a face. The vocabularies of facial features contain typical appearances of facial fragments obtained from a set of people unrelated to the face that should be reconstructed. To exemplify and simplify the system, assume that the vocabulary contains a set of typical images for each facial component, such as the nose, eyes, eyebrows, etc. Choosing the best match for each part and placing those parts in the spatial configuration similar to the sought face is likely to produce an output close to the original face. The reconstruction process is very fast, and although the result may not be photo-realistic, it can still suffice for recognition.

In SCiFI more parts are used than are commonly used by humans, and they do not necessarily correspond to the semantic parts of a face. Optionally, a face may be represented by a vector which is composed of (1) indices into part vocabularies, and of (2) quantized relative distances of the parts to the center of the face. To each part is assigned a set of words from the corresponding vocabulary, instead of a single match, e.g., the nose might be represented by the indices of the four noses from the vocabulary which are most similar to it. Such flexibility in the representation makes it robust to image conditions and local noises. Any two representations are essentially sets that can be compared by a secure computation of their set difference.

The face recognition part is very fast, it does not require dense correspondence between the input and database faces but rather, typically, only 3-5 points for initial alignment of faces, and it does not use 3D models or any extensive training. The secure computation of this method has a relatively small overhead, which means that it can be deployed in real systems.

The SCiFI system is the first secure face identification system that is suited for real-life applications. The advantages of certain embodiments of SCiFI over existing identification methods include some or all of the following:

a. As is demonstrated by experiments, the SCiFI system uses a face identification method which provides results that are comparable to the state-of-the-art in illumination invariant face recognition, and achieves very good robustness to occlusions. The method can be based on computing the Hamming distance, and is therefore a natural candidate for secure computation. The results are superior to those of the Eigenfaces algorithm.

b. SCiFI uses efficient secure computation techniques to identify, without leaking any other information, whether a given image is in a suspects list. Even better privacy is provided by the dSCiFI system, which distributes the knowledge of the database items between different server machines, with only negligible additional overhead.

c. A complete SCiFI system may compute the face representation at the client and then run a secure computation with the server. Experiments of both the accuracy of face identification, and of the performance timing of the entire system including communication between the parties were run. Even though the cryptographic part was implemented in Java, its performance is remarkably fast, due in part to optimizations which perform the computation intensive tasks in a preprocessing stage, and therefore enable near real-time identification of suspects.

Another attractive property of SCiFI is that face identification is done through an interactive method in which server and client interact. One advantage of this property is that the method reveals to the client an upper bound on the number of items in the server's database, and therefore the client can be assured that the server does not use the system for large scale image identification e.g., for comparing the client's input with images of all people who have a criminal record. Another advantage is that the server cannot store the client's input for future use. This prevents the server from, say, comparing those who pass by the client's camera today to suspects whose faces may become known in the future.

Generally, face recognition is well known in the art [25, 47].

Referring now to step 20 of the method of FIG. 1B, an ideal face representation should be robust to illumination changes, occlusions, and other variations of the image. In particular, illumination variations are known to greatly influence the appearance of human faces. Adini et al. [2] have shown that images of different faces under similar illumination vary less than the same face under different illumination. This is a great obstacle to any face identification system operating in real-life conditions.

Systems for robust face cognition are known which use real-valued representations of faces, and therefore cannot be used as-is in secure computation. Straightforward attempts to quantize the values of the representations result in poor recognition results.

The Eigenfaces algorithm has a recognition performance which is poor if the training and suspect images were taken in different conditions as indicated in experiments described below. The Eigenfaces algorithm represents faces in a low-dimensional vector space (face space), whose basis images, the Eigenfaces, are obtained by principal component analysis. Every face is represented as a vector in the face space by projecting the face image onto the subspace spanned by the Eigenfaces. Recognition is done by finding the minimal distance between the projection of the new image into the face space, and the projections of the faces in the database, and checking if this distance is below some threshold, The method of FIG. 1B typically comprises offline preparation of vocabularies of facial features, offline preparation of face representations in the server's list, offline learning of individual thresholds for the server's list, offline initialization, by server and client, of a crytographic method, online face acquisition by client, online generation of face representation s from the offline learning step, and running a secure protocol checking for match between face representation s and the server's list of face representations. It is appreciated that performing certain operations off-line is an optimization and alternatively, some or all operations described herein as being performed off-line, may alternatively be performed on-line.

In step 10, a regular grid is defined, corresponding to the centers of the parts, over facial area with higher variance, namely eyes, eyebrows, nose and mouth. The patch sizes were chosen to be relatively small e.g. 20% of face width in order to have many patches with minimum overlap. The grid is used to define the locations of patches in images of faces processed by the system, specifically, it is used in steps 10 20 and 60.

Figure 2:
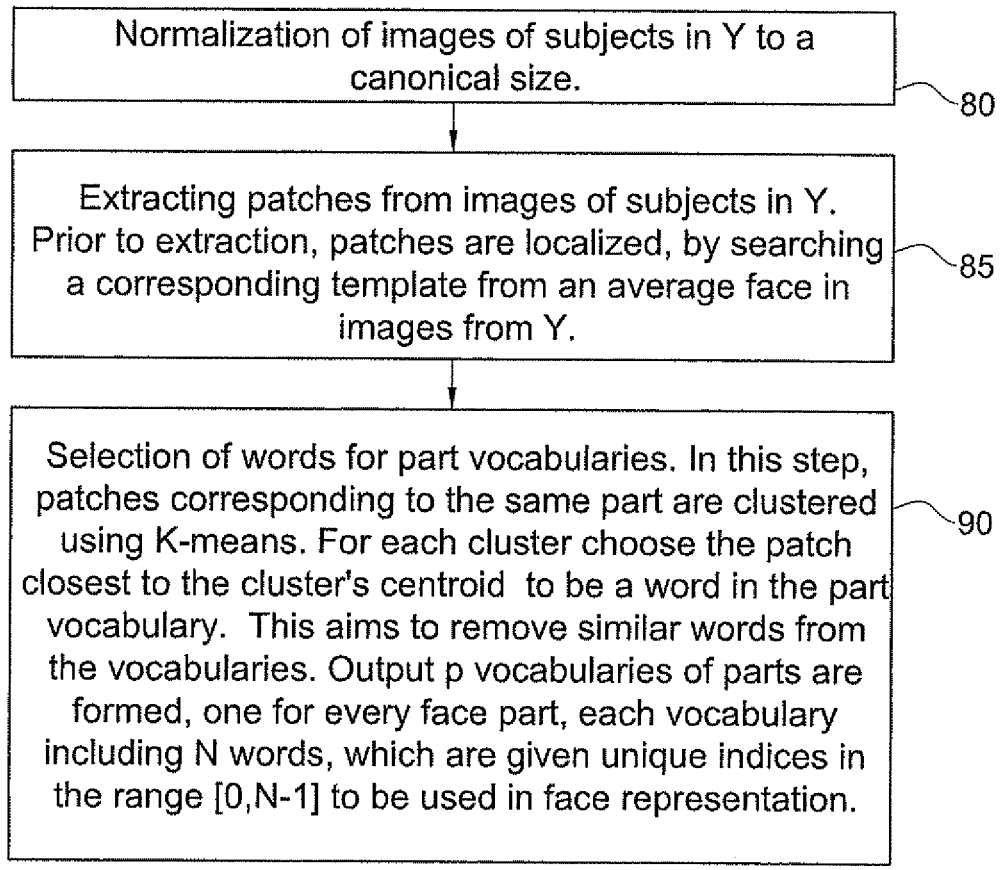
FIG. 2 is a simplified flowchart illustration of a method for performing the facial feature vocabulary offline preparation step in the method of FIG. 1B.

A method for Construction of part vocabularies, suitable for implementing step 10 of FIG. 1B, is now described with reference to FIG. 2. Let X denote a set of people enrolled in the recognition system. Assume a (possibly public) database Y of faces unrelated to X. While this database is public, it is desired to protect the data in X. Divide a face into p parts and build vocabularies of typical appearances (termed herein "words") per part using Y. Let V={$V_1, \ldots V_p$} denote the part vocabularies where, for example, in a simplified way, $V_1$ might include 20 options for each of several nose sub-areas, $V_2$ includes 20 options for each of several mouth sub-areas, and so on. The construction of part vocabularies V may comprise the following steps as shown in FIG. 2: Normalization of images of subjects in Y to a canonical size step 80), extracting patches from images of subjects in Y (step 85), and selection of words for part vocabularies (step 90).

In Normalization step 80 of FIG. 2, it is assumed that the position of the eyes and mouth in each image are known. All images in Y are normalized by scaling the distance from the point between the eyes to the center of the mouth to be the same; the exact size is arbitrary.

Figures 5, 6:
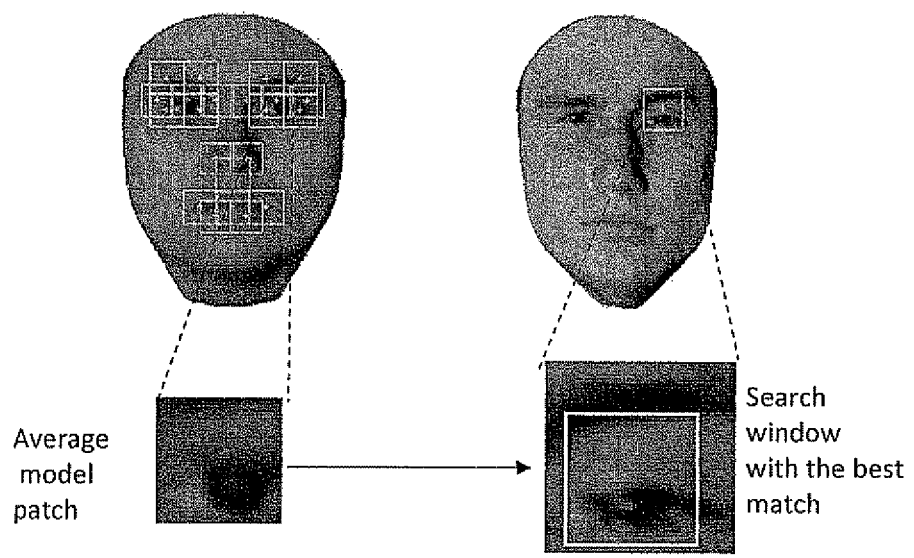
FIG. 5 is a table of Partial occlusion results on a subset of CMU-PIE Database, containing images of 68 people in frontal pose, imaged under 10 illuminations.
FIG. 6 is a pictorial illustration useful in understanding certain aspects of certain embodiments of the present invention.

In step 85, prior to extraction, patches are localized, by searching a corresponding template from an average face in images from Y. An average face is a face obtained by averaging over a large number of aligned faces The patch localization operation of step 85, as shown in FIG. 6, may be done by extracting a patch at the grid point in the average model (denote S) and a larger window around the same grid point in the image from Y (denote W), and searching for best match of S in W. The patches are represented by SIFT descriptors [26] and are compared using an L2 norm.

Step 90 performs the selection of words for part vocabularies. In this step, patches corresponding to the same part are clustered using K-means. For each cluster a patch is chosen that is closest to the cluster's centroid to be a word in the part vocabulary. This aims to remove similar words from the vocabularies. At the end of the process p vocabularies of parts are formed, one for every face part. Each vocabulary containing N words, which are given unique indices in the range [0,N−1] to be used in the face representation.

In Construction of part Vocabularies in step 10, the spatial information is modelled by the distance from the center of a part to the center of the face. During the preprocessing stage, estimate the distance distributions of the parts and quantize them into a number of bins. Each bin is given a unique index. The estimation is done on the subjects from the public set Y.

Referring now to step 20 and 60 in the method of FIG. 1B, in both steps an image of a face is converted to an index-based representation that may be compared by a discrete metric. The representation is based on the assumption that facial features have a number of typical appearances and almost every face can be generated by combining such components. Let X denote a set of people enrolled in the recognition system. Assume a (possibly public) database Y of faces unrelated to X. While this database is public, it is desired to protect the data in X. Divide a face into p parts and build vocabularies of typical appearances (termed herein "words") per part using Y. Let V={$V_1, \ldots V_p$} denote the part vocabularies where, for example, in a simplified way, $V_1$ might include 20 options for each of various sub-areas of the nose, $V_2$ includes 20 options for each of various sub-areas of the mouth, etc. Let I be an image of a person from X. Represent I as a vector of indices, denoted s, of words from the part vocabularies which are most similar to the parts in I. Certain embodiments of the invention produce almost identical vectors of indices from different images of the same person. Different face representation vectors can now be compared by computing, for example, their set difference. The set difference of two sets A and B is defined as the difference between the size of their union and the size of their intersection; if A=B then their set difference is 0.

Previous research shows that locations of facial features in a face have good discriminative power. Thus the representation shown herein typically takes these locations into account as well, and includes quantized distances from each part of the face to the center of the face. A detailed description of the representation is provided herein with reference to step 20 of FIG. 1B.

The proposed representation has a number of advantages: (1) The model is tailored for computing the set difference and the Hamming distance, which are discrete metrics that can be used in secure computation. (2) The vocabularies of parts are constructed from a set Y of people unrelated to the set X of enrolled people, and therefore there is no need to store the original data of the persons enrolled in the system. (3) The representation also makes it possible to use only a single image per person for recognition, which is an important feature for practical systems where, say, only a single photo of a suspect is available. (4) The vocabularies are constructed from Y, and therefore they stay fixed whether X changes or not, and thus no retraining is needed when a new subject is added to the system. (5) The proposed model is more flexible than the existing part-based face representations, because each part, according to certain embodiments of the present invention, is represented by an unordered set of appearances. The use of set difference for comparison allows for partial similarity between the representations of the same individual. This contributes to the robustness against occlusions, shadows, highlights, and other local changes in appearance. (6) The proposed representation uses facial components which are small patches, which allows to assume their planarity and use illumination insensitive local descriptor of patches (e.g., SIFT) in order to cope with varying illumination. To summarize, the proposed representation is very robust to environmental changes and is designed to be incorporated with privacy preserving mechanisms. These features make it an excellent choice for security applications.

In steps 20 and 60, it is assumed that the input to the system is an image of a face in which the positions of the eyes and mouth are known. The positions of the eyes and mouth can be marked manually by an operator or determined using automatic methods for detection of facial features [46, 17]. These positions are used for alignment purposes. The input image is normalized to the canonic size as described above with reference to FIG. 2, step 80. The representation of a face typically has the following form. Denote by N the number of words in each part vocabulary, and by p the number of parts in the face representation. A full face representation is in the format $s=(s^a, s^s)$ and contains the following components:

$s^a$ is the appearance component and is composed of p sets $s^a_1, \ldots s^a_p$, one set per facial part, where each set contains the indices of n out of N words of the part vocabulary. To select a set $s^a_i$ for the part I, define a window centered at the corresponding grid point in the input image. Then every word from the part vocabulary is matched against the defined window. The indices of the n words that most resemble the part i are selected for the set $s^a_i$. Typically, the indices of the n words, whose SIFTs have the smallest Euclidian distance with the SIFT of part i are selected.

$s^s$ is the spatial component of the representation. Since it is desired to use discrete values, the representation uses quantized distances. The spatial part is therefore composed of p sets $s^s_1, \ldots, s^s_p$, where each set contains z indices of bins of quantized distance from the center of the face e.g., the set $s^s_i$ is a quantized representation of the distance of the ith part from the center of the face. Denote the total number of these bins by Q. The i'th part of the input face is localized by matching the same part from the average face against the local window centered at the grid point. The matching is done by computing the Euclidian distance between SIFT descriptors of the patches.

One possible implementation uses p=30 face patches, with a vocabulary of N=20 visual words and Q=10 quantized distance bins per patch. It was found best to set the number n of indices in each set $s^a_i$ to 4. The number z of indices in each set is 2. This means that the appearance component contains p=30 sets, where each set contains n=4 words out of N=20 options. The spatial component contains p=30 sets of z=2 words out of Q=10 options.

The above representation is computed and stored for every face in the server's list during the offline stage (step 20) and for every input face in the client during the online stage. In step 70, the identification task comprises deciding if a face in the image acquired by the client matches one of the faces in the database stored by the server. Two images are said to match if the set difference between their two representations is below some predefined threshold. To increase the accuracy of recognition, the system learns, in a preprocessing stage, an individual threshold for every person in the database. Then, in the real time phase, the representation of the client's face is compared with every face representation in the database and is said to match it if their set difference is smaller than the corresponding threshold. The set difference of two sets A and B is defined as the difference between the size of their union and the size of their intersection; if A=B then their set difference is 0. If the client's face passes at least one of the individual thresholds it is identified as a match.

In step 30, an individual threshold is computed for each enrolled person. A possible method for setting the individual threshold is as follows: The threshold on the set difference for each person is set to discriminate him/her from an ensemble of people which includes individuals registered in the system and can also include other subjects unrelated to the system which ideally represents typical inputs to the system. An initial threshold for the ith user is set based on the smallest set difference between him and the rest of the people in the ensemble and is corrected according to the viewing conditions in the image which can be determined in the client's module and sent to the server without revealing any information about the face.

According to certain embodiments of the present invention, an initial threshold for the i-th user is set based on the smallest set difference between him and the rest of the people in the ensemble. For example, the initial threshold for the i-th user may be a portion p of the smallest set difference such as 80% of the smallest set difference. Optionally, thresholds may be suitably adapted to viewing conditions.

Still referring to step 30, previous methods in face verification usually learn individual thresholds based on the intra user variation which is variation in different images of the same face. Such an approach is typically not used in applications in which SCiFI has only a single image of a person for registration. Typically, the invariance of the face representation to illumination changes, and its robustness to occlusions reduces the intra-user variance, but does not cancel it completely. There are two possible solutions to this problem. One is based on the assumption that intra-user variation is independent from the identity of the user, meaning that the variance of the representation depends on the viewing conditions and occlusions and not on the user himself. Then, learn this variation using a public database. However, some people tend to change their appearance more than others (makeup, facial hair etc). An alternative solution is to determine a threshold on the set difference for each person that may discriminate him/ her from an ensemble of people which includes individuals registered in the system and can also include other subjects unrelated to the system which should ideally represent typical inputs to the system. An initial threshold for the ith user is set based on the smallest set difference between him and the rest of the people in the ensemble and is corrected according to the viewing conditions in the image which can be determined in the client's module and sent to the server without revealing any information about the face.

In step 40, initialization need not include initialization of the cryptographic algorithms. This is an optimization however.

Figure 7:
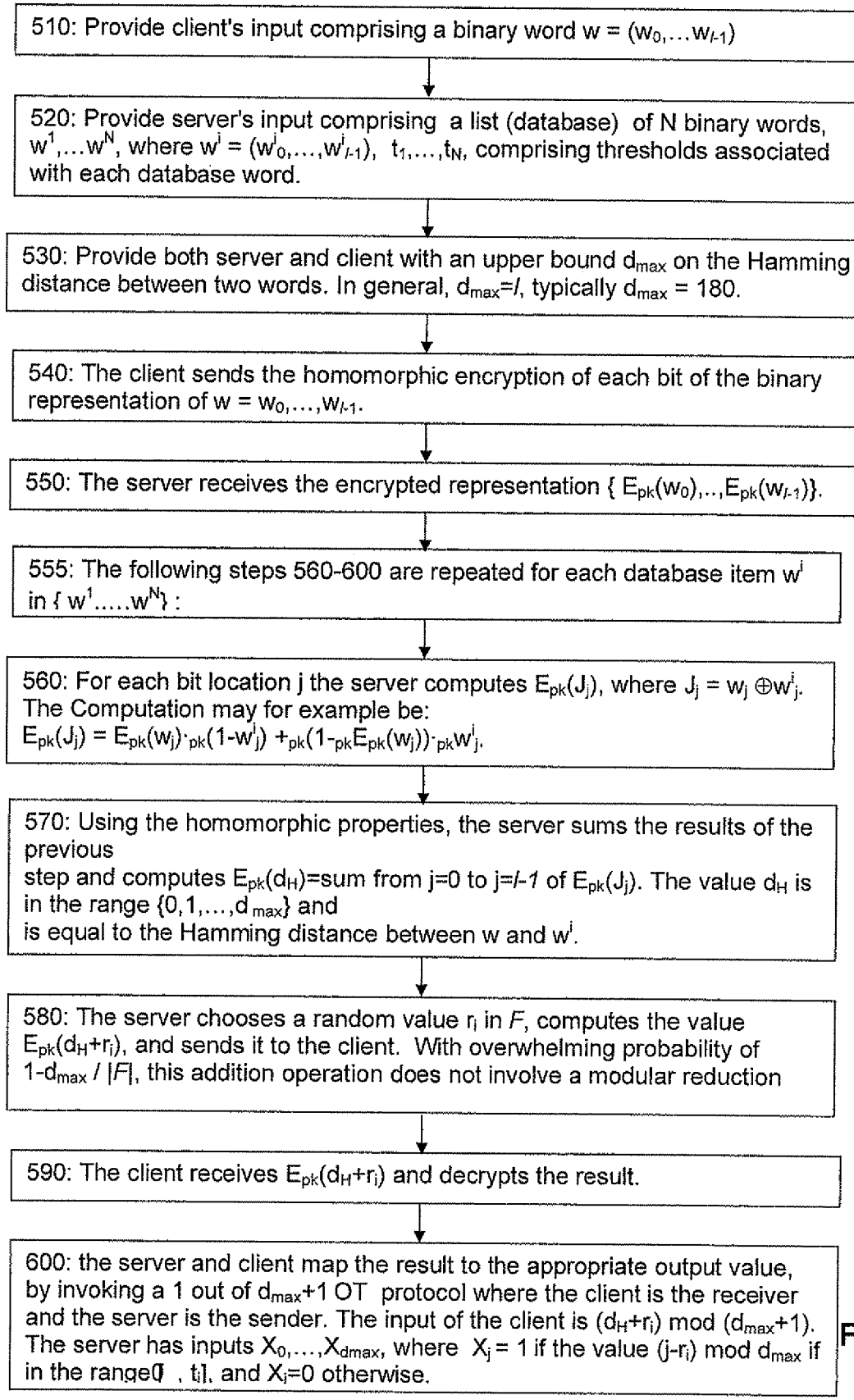
FIG. 7 is a simplified flowchart illustration of a third method, also termed herein $F_{threshold}(w,(w^1, \ldots, w^N))$, for performing the secure face matching step in the method of FIG. 1B, including security features.

Referring now to step 70, a secure protocol which computes the face identification method, also termed herein "$F_{threshold}$" which only the client learns an output, is described in FIG. 7. In the method of FIG. 7, the client and server first use homomorphic encryption to count the number of locations in which their two input words differ. The result is in the range $[0,d_{max}]$. None of the parties learns this value, but the client learns the sum of the Hamming distance and of a random number r chosen by the server. Generally, the term "Hamming distance" as used herein is intended to be one possible example of a metric based on similarities between sets and is not intended to be limiting.

Next, the two parties use an invocation of a 1-out-of-($d_{max}$+1) oblivious transfer protocol, also termed herein "OT", to map the result to the appropriate output value. It is appreciated that 1-out-of-N Oblivious transfer, denoted $OT_1^N$ is a two party protocol, run between a sender with N inputs $X_0, \ldots, X_{N-1}$, and a receiver with an input i in the range $\{0, \ldots, N-1\}$. The receiver typically learns $X_i$ and nothing else, and the sender learns no information. Variants of OT are well known in the art. OT is a known tool of secure computation, and secure computation can be based upon OT alone.

The sender is the server in the OT protocol, and it has the OT inputs to be where $X_0, \ldots, X_{dmax+1}$ where $X_j$ is equal to 1 if the index j, rotated cyclically by r mod ($d_{max}$+1), is between 0 and the threshold $t_i$. The receiver is the client. Its input to the OT is the sum of the Hamming distance and r.

A. Various optimizations of step 40 in FIG. 1B are now described which can be provided separately, in any suitable combination, or not at all.

a. Oblivious transfer: It is known how to implement $OT_1^N$ using log N invocations of $OT_1^2$ and N symmetric encryptions. $OT_1^2$ can be implemented using several public-key operations e.g. exponentiations, using, say, El Gamal encryption. It is also known how to preprocess the public-key operations required for the OT protocol: In the preprocessing stage the server prepares N random pads and the parties run a $OT_1^N$ of these values, where the client's input is a random index i. In the online stage, the client, which wants to learn item i, sends the difference between i and i to the server, which shifts the order of its pads accordingly. The server then computes the exclusive-or of each pad with the corresponding input X, and sends the results to the client who can typically decrypt only one of these values. As a result, online computation comprises only of efficient exclusive-or operations. This variant of OT may be used herein.

Using the facts described here, it is possible to move most of the computation and communication overhead of the OT to a preprocessing stage. A 1-out-of-$d_{max}$+1 OT protocol can be implemented using log ($d_{max}$+1) invocations of 1-out-of-2 OT e.g. 8 invocations of 1-out-of-2 OT since $d_{max}$=180. Moreover, the public-key operations of the OT can be pre-computed before the inputs are known. The online phase requires sending symmetric encryptions of the sender's inputs. In the $F_{threshold}$ method described herein, the sender's inputs $X_i$ are single bits. Therefore the online step of the OT comprises sending a (log $d_{max}$)-bit long offset from the receiver to the sender, and a string of $d_{max}$=180 bits from the sender to the receiver.

b. Homomorphic operations. The main online computational overhead is typically thus that of computing the homomorphic operations which are required for computing the Hamming distance. In experiments performed, homomorphic encryption took about 38 msec, addition took less than 1 msec, while subtraction took about 62 msec. Computing a subtraction of homomorphic encryptions is costly, as it requires computing the additive inverse. These results used a certain implementation in Java, but most implementations have the same ratio between the performance of the different operations. It is therefore beneficial to minimize the number of subtraction operations that are employed.

Regarding computation of the Hamming distance of w and $w^i$: For each bit location j, the server typically adds $E(w_j)$ to the sum, if its own bit $w^i_j$ is 0, or add to the sum the value $(1-E(w_j))$ if its own bit $w^i_j$ is 1. The computation is expected to perform 1 addition and ½ subtraction operations. The server can improve the overhead by separately computing the values $E(s_0)$=the encryption of the sum of all $w_j$ for indices i for which $w^i_j$=0, and $E(s_1)$=the encryption of the sum of all $w_j$ for indices i for which $w^i_j$=1. Also use $n_1$ to denote the number of bits in $w^i$ which are equal to 1. Then the encryption of the Hamming distance can be computed as $E(s_0)-E(s_1)+E(n_1)$. The computation according to this method requires 1 homomorphic addition and only a single subtraction per database item.

c. Reducing online communication. In the method of FIG. 7 the client sends a homomorphic encryption of each of the 1=900 bits of the face representation that it has. Recall that the length of a Paillier encryption is typically at least 2048 bits, but may be more than 3000 bits, if reasonable security is required. These encryptions are typically sent after the client receives its input. It is possible, however, to send these encryptions in a preprocessing stage, thus reducing the online communication overhead. In order to do that, the client chooses a random 1 bit binary string $v_0, \ldots, v_{l-1}$ and sends the encryptions of these bites to the server in the preprocessing stage. Later, when the client receives its input, it sends the 1 bit string $w_0 \oplus v_0, \ldots w_{l-1} \oplus v_{l-1}$ to the server. The server modifies its operation in Step 560 according to the correction bit $v_j \oplus w_j$ that it received. Namely, instead of using its bit $w^i_j$ to decide what operation to apply to the homomorphic encryption $E(w_j)$, it uses the bit $w^i_j \oplus (w_j \oplus v_j)$ to decide which operation to apply to the encryption $E(v_j)$. The optimization listed above can also be modified to use $E(v_j)$ and $(w_j \oplus v_j)$ instead of $E(w_j)$.

d. Further reducing the number of homomorphic operations. If the optimization of the online communication, described above, is not used, and the server receives the encryptions $E(w_0), \ldots E(w_l-1)$, consider the ith item in the server's database and examine pairs of the bits of its representation. If $(w^i_0, w^i_1)=(0,0)$, then the value $E(w_0+w_1)$ is added by the server to the Hamming distance. If $(w^i_0, w^i_1)=(0,1)$, then the value $E(w_0+(1-w_1))$ is added to the Hamming distance, etc. Let the server first compute the four possible combinations $E(w_0+w_1)$, $E(w_0+1-w_1)$, $W(1-w_0+w_1)$ and $E(2-w_0-w_1)$. Then for each of the N items in the server's database it now only needs to perform a single addition operation, instead of two, in order to add the right value to the sum. It is not hard to see that the same method can also be applied when the optimization of online communication is used. In that case the server receives in the preprocessing phase the values $E(v_0), \ldots, E(v_{l-1})$, and precomputes the four possible combinations of each pair of successive bits. Then, after receiving the correction string, it can decide which of the four options is to be added to the sum.

In the preprocessing phase this method computes 7 homomorphic additions and 2 subtractions for each of the $\frac{1}{2}$ pairs of input bits. The gain is in the online phase, where for each of the N database items the server needs to compute only $\frac{1}{2}$ homomorphic additions instead of 1 addition.

While this optimization may implemented only with pairs of input bits, it can be extended to handle sets of three or more consecutive bits. By processing sets of three bits, for example, the overhead of the preprocessing phase increases to 16/3·1 additions and 1 subtraction. The online overhead is reduced to $\frac{1}{3}$ addition operations.

In FIG. 1B, after the server receives the homomorphic encryptions from the client, it runs, for each item in its database, a computation which is independent of the other elements in the database. It is therefore possible to parallelize the operation of the server such that each processor or core handles a different set of faces in the server's database.

Certain embodiments of the method of FIG. 1B are now described in detail. Referring now to step 70 in the method of FIG. 1B, secure computation (or Secure Function Evaluation—SFE) typically involves several parties with private inputs that wish to compute a function of their joint inputs, without revealing to an adversarial party (or a coalition of such parties) any information that cannot be computed using the input of the adversary and the output of the function.

There exist well known solutions for secure computation of any function e.g. as described in [45] for the two party case, or in [16]. The general method employed by most of these solutions is to construct a combinatorial circuit that computes the required function, and run a distributed protocol that securely evaluates the circuit gate by gate. The communication overhead of these generic protocols is linear in the size of the circuit, and the computation involves an oblivious transfer for each input bit, It seems hard to apply these methods to compute continuous functions or represent Real numbers, since the methods inherently work over finite fields.

A previous attempt at secure computation of a face recognition method handled the Eigenfaces algorithm. A secure method for computing this algorithm was presented in [15], and a considerable improvement in efficiency was shown in [35]. The secure method in that publication computes a quantized version of Eigenfaces. The quantization did not affect the recognition performance so much, but the original Eigenfaces algorithm is not very good in recognizing images taken in unseen conditions.

The Eigenfaces algorithm is based on computing the Euclidean distance, whose secure computation is more complicated than that of the Hamming distance. Certain embodiments of the present invention are operative to translate a face recognition task using a computation of the Hamming distance, which lends itself more efficiently to secure computation.

To exemplify the efficiency of SCiFI, note that the secure computation of Eigenfaces sends a homomorphic encryption of every pixel of the image. The experiments conducted in [15, 35] use images of 92×112=10304 pixels. (It is hard to imagine that smaller images could be used for meaningful recognition.) This image size translates to more than 10,000 homomorphic encryptions, and any increase in the image size which may be needed in order to improve the quality of recognition may result in an increase in this number. In SCiFI, on the other hand, a face is always represented by a vector of 900 bits, independently of the size of the image. The system sends a homomorphic encryption per each of these 900 bits. Moreover, this communication can be done in a preprocessing phase, while the online communication requires sending only a single 900 bit representation of the face.

Prior art publications discussing secure computation of Eigenfaces provide timing results for the implementation of the secure computation part alone as well as, typically an analysis of the number of bytes that are to be communicated. Experiments reported herein also time the communication layer, including socket opening.

Referring again to FIG. 1A, the SCiFI system is composed of a server and a client. The operation of the system can be separated into an offline (or preprocessing) part, and an online part. The functional structure of the SCiFI system according to certain embodiments of the present invention is described in the table of FIG. 1C. The offline part prepares the face recognition database, by computing representations of the faces that are in the server's list. This stage is also used to execute some initializations and preprocessing of the cryptographic algorithms. The online part is executed after the client obtains an image. This part decides whether the image is of a person who appears in the list, and can be separated into two distinct stages. In the first stage the client prepares a representation of the face that it acquired. In the second stage the two parties execute a cryptographic method which compares the client's representation with those in the server's list, and decides whether there is a match between them typically without revealing any other information. The face recognition aspect of the method of FIG. 1B is described herein separately from the security aspect thereof, however in practice, both aspects are integrated e.g. as shown in FIG. 1B.

In a variant termed herein the "dSCiFI variant" of the system the role of the server is distributed between m different machines. It is assumed that one entity has the database of suspect faces, but it does wish to store this database on any single machine which is connected to an external network, for fear of attacks that might compromise it. Therefore each of the m server machines stores part of the database, so that breaking into any subset of these m machines reveals only partial information about any of the faces. The client then interacts with the m machines, and eventually the output is computed. A preferred mode of operation is where no interaction or synchronization is required between the server machines, but rather each one of them can separately interact with the client. Typically, step 20 of FIG. 1B includes a step whereby the server sets several (m) machines for the task of running the secure protocol with the client. Each machine is given access to only part of the set of face representations—say, the description of only a single face feature, such as the nose, in every face. It has no information about the contents of the other parts of the face representation. The secure protocol of step 70 is then run between the client and the m machines. Optionally, no interaction or synchronization is required between the m server machines, but rather each one of them separately interacts with the client.

Referring again to step 70 in the method of FIG. 1B, the recognition task in SCiFI and dSCiFI comprises deciding if a face in the image acquired by the client matches one of the faces in the database stored by the server. Two images are said to match if the set difference between their two representations is below some predefined threshold. To increase the accuracy of recognition, the system learns, in a preprocessing stage, an individual threshold for every person in the database. Then, in the real time phase, the representation of the client's face is compared with every face representation in the database and is said to match it if their set difference is smaller than the corresponding threshold. If the client's face passes at least one of the individual thresholds, it is identified as a match.

Still referring to step 70, cryptographic algorithms used for secure computation of face recognition are now described. Typically, as much as possible of the computation is pushed to a preprocessing stage which can be performed before the client obtains its inputs. This is done in order to optimize the time it takes to securely compute a face recognition after obtaining an image of a face. An alternative approach to the methods shown and described herein is to apply Yao's generic secure [45] two-party protocol to the recognition method. This typically requires expressing the method as a circuit which computes and compares many Hamming distances, and then sending and computing that circuit. The protocol would have had to perform 900 oblivious transfers, instead of 9 oblivious transfers per item in the server's database, as is described for the $F_{threshold}$ method of FIGS. 3A-3B. It is therefore believed that the performance of methods shown herein is significantly better than that of applying generic protocols.

Security against semi-honest adversaries is now described. Namely, assume that corrupt parties follow the protocol but might try to learn additional information. Formal definitions of security terminology used herein are provided in [16] e.g. for the semi-honest case. Security can be defined by comparing the system to an imaginary "ideal setting" where there is a trusted third party which receives the inputs of both parties and informs them whether a match was found. In that setting it is clear that no other information is revealed to the parties. SCiFI typically does not disclose more information than is revealed in the ideal setting. In the case of dSCiFI, each server machine discloses to the trusted party its share of suspects images. Again, no information but the result of the match is revealed.

The methods described herein are based on the use of homomorphic encryption and oblivious transfer. These primitives and methods for performing all cryptographic public-key operations of the oblivious transfer protocol in an offline preprocessing stage, are now described and henceforth used e.g. in experiments in order to optimize the online performance of the protocols:

Additively homomorphic encryption is public-key encryption which enables, given two encryptions $E(m_1)$, $E(m_2)$ and without knowledge of the private key, to compute $E(m_1+m_2)$, or compute $E(c \cdot m_1)$ for any known constant c. An example of this technology is the Paillier cryptosystem [32]. 1-out-of-N Oblivious transfer, denoted $OT_1^N$, is a two party protocol, run between a sender with N inputs $X_0, \ldots, X_{N-1}$, and a receiver with an input $i \in \{0, \ldots, N-1\}$. The receiver learns $X_i$ and nothing else, and the sender learns no information. There are different variants of OT and rich research on this subject exists. OT is the basic tool of secure computation, and it has been shown how to base secure computation on OT alone.

It was shown in [29] how to implement $OT_1^N$ using logN invocations of $OT_1^2$ and N symmetric encryptions. $OT_1^2$ can be implemented using several public-key operations (i.e., exponentiations), using, say, El Gamal encryption. To preprocess the public-key operations in a "preprocessing stage", the server prepares N random pads and the parties run a $OT_1^N$ of these values, where the client's input is a random index i. In the online stage, the client, which wants to learn item i, sends the difference between i and i to the server, which shifts the order of its pads accordingly. The server then computes the exclusive-or of each pad with the corresponding input X, and sends the results to the client who can typically decrypt only one of these values. As a result, online computation comprises only of efficient exclusive-or operations. This variant of OT may be employed in implementation of certain embodiments of the present invention.

Still referring to step 70 of the method of FIG. 1B, the cryptographic method of SCiFI receives its input from the face recognition part of the system. The functionality of this method is now defined in terms of its input and output, in accordance with certain embodiments. The input of the client, as well as each entry in the server's list, contains a representation of face, in the format defined herein with reference to step 20. This representation may be translated to an equivalent representation as a binary vector, more convenient for applying the cryptographic method. The new representation is defined as follows:

Every set $s^a_i$ is represented as a binary vector $v^a_i$ of length N=20. Each bit of $v^a_i$ corresponds to a different index of an entry in the part vocabulary. The vector $v^a_i$ has exactly n=4 bits set to 1, in the locations of the n indices in the set $s^a_i$.

Every set $s^s_i$ is represented as a binary vector $v^s_i$ of length Q=10. Each bit of $v^s_i$ corresponds to a different bin of quantized distances. The vector $v^s_i$ has exactly two bits set to 1, in the locations of the indices in the set $s^s_i$.

A face is represented as a vector $v=v^a_1 | \ldots | v^a_p | v^s_1 | \ldots | v^s_p$.

The length of V is $p \cdot (N+Q) = 30 \cdot (20+10) = 900$ bits.

The set difference between the representations s,s' of two faces, is exactly equal to the Hamming distance of the vectors v,v'. The Hamming distance of these 900 bit vectors can be at most $p \cdot 2 \cdot (n+2) = 30 \cdot 2 \cdot 6 = 360$, since each $v^a_i$ component has only n=4 bits set to 1, and every $v^s_i$ component has only 2 bits set to 1. Furthermore, in experiments, the maximum Hamming distance between two face representations was found to be even smaller. Denote the bound on the value of the Hamming distance as $d_{max}$. In experiments this was found to be $d_{max}=180$. This may be used to further optimize the cryptographic method.

The output of the client, according to certain embodiments of the invention, is now described. The system is operative to identify a match between the client's input and an item in the database. Typically, it is expected that only a single match will be found, since each entry corresponds to a different face. There are different options for identifying a match based on the Hamming distance of the face representations. Two example functions which can be used for this purpose are:

a. $F_{threshold}$. This functionality has an additional input, a threshold $t_i$, for each face in the server's database. The functionality computes the Hamming distance between the representation of the client's input and each of the representations of the items in the server's list. The output is the index of the item (or items) in the server's list whose Hamming distance with the client's input is smaller than the corresponding threshold $t_i$.

b. $F_{min+t}$. The output is the index of the item in the list whose Hamming distance with the client's input which is minimal. However, if this distance is larger than the threshold, i.e. if no database item is closer to the input than the threshold, then no output is given.

Typically, the "right" functionality is selected. The outputs of the functionalities $F_{threshold}$ and $F_{min+t}$ only differ when the basic method finds the client's image to be similar to more than a single face in the server's database. Ideally this would not happen since a person should only be similar to himself. Still, if the similarity thresholds $t_i$ are not accurately calibrated then a single image might be considered by the method to be close to two or more database images e.g. the set differences will be smaller than the corresponding $t_1$ values. In that case the $F_{threshold}$ functionality outputs the identities of all database items which are close to client's input, whereas $F_{min+t}$ only outputs the identity of the closest item. While $F_{min+t}$ provides more privacy, one could argue that it is more reasonable to use $F_{threshold}$, since similarity to any of the suspects has to be investigated. Also, secure computation of $F_{min+t}$ is harder than that of $F_{threshold}$. For both of these reasons, in experiments, only the latter were implemented in the SCiFI system although the computation of both functionalities are described herein.

It is possible to let only the client, only the server, or both parties, learn the output of the computation. Protocols for all these cases are described below.

Still referring to step 70 of the method of FIG. 1B, a method for secure computation of the $F_{threshold}$ functionality is now described with reference to FIGS. 3A-3B, followed by a description of how to optimize the implementation of the protocol. A $F_{min+t}$ method is described next. State of the art methods are described in [19].

As described herein with reference to step 70 of FIG. 1B, each face representation is of length $l=p\cdot(N+Q)=900$ bits. The Hamming distance between two representations is known to be at most $d_{max}=180$.

Figure 3B:
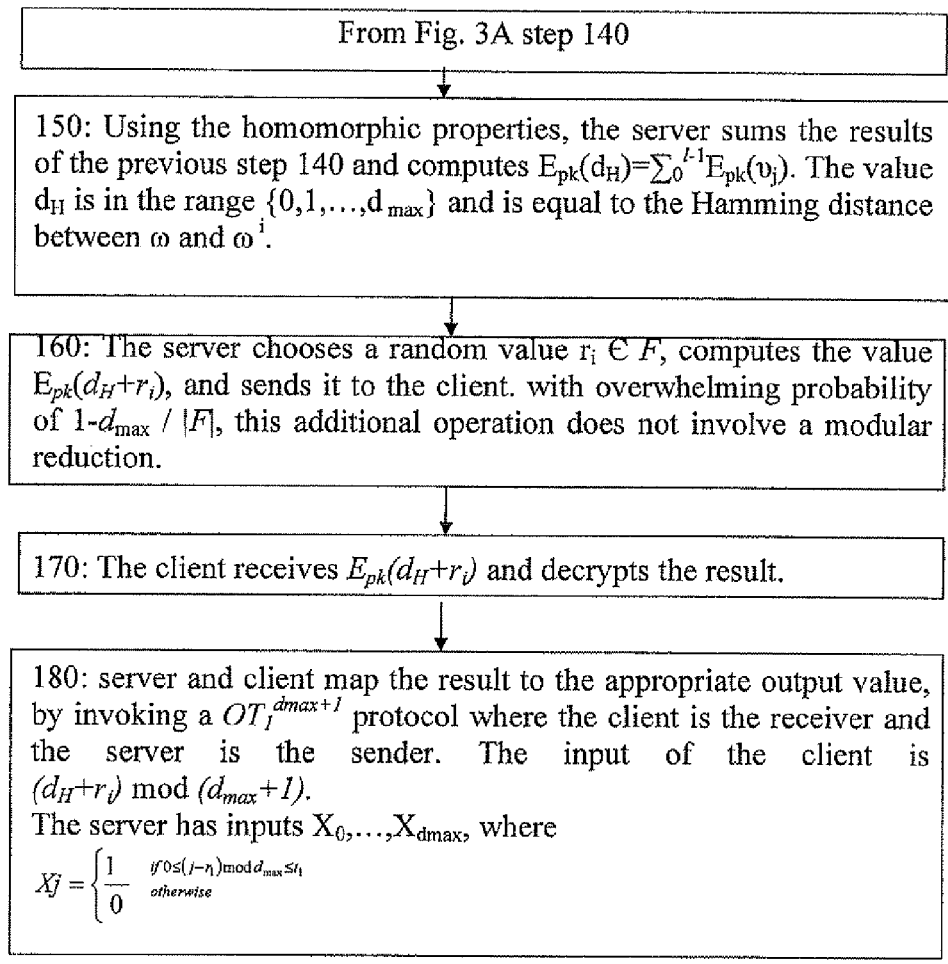

The secure protocol computing $F_{threshold}$, where only the client learns an output, is described in FIGS. 3A-3B. In the protocol the client and server first use homomorphic encryption to count the number of locations in which their two input words differ. The result is in the range $[0,d_{max}]$. None of the parties learns this value, but the client learns the sum of the Hamming distance and of a random number r chosen by the server. Next, the two parties use 1-out-of-$(d_{max}+1)$ oblivious transfer to map the result to the appropriate output value: The sender is the server, and it sets the OT inputs to be $X_0, \ldots, X_{dmax+1}$ where $X_j$ is equal to 1 if the index j, rotated cyclically by r mod $(d_{max}+1)$, is between 0 and the threshold $t_i$. The receiver is the client. Its input to the OT is the sum of the Hamming distance and r.

FIGS. 3A-3B, taken together, form a simplified flowchart illustration of a method whereby a $F_{threshold}$ protocol is followed which allows a client to learn output. In Step 160 of the method of FIGS. 3A-3B, the server computes the value $E(d_H+r_i)$, where $r_i$ was chosen at random. If $r_i<|F|-d_{max}$, which happens with overwhelming probability, the computation of $d_H+r_i$ in F does not involve a modular reduction and has the same result as adding them over the integers. In that case, reducing the result modulo $d_{max}+1$ (in Step 180 of FIG. 3A) is equal to $(d_H+r_i)$ mod $(d_{max}+1)$. The client uses this result as its input to the 1-out-of-$(d_{max}+1)$ OT protocol. The server, on the other hand, sets the sender's inputs in the OT to be shifted by r, locations. As a result, the output of the client in the OT protocol is as required. As for security, assuming that the OT protocol is secure, the server learns nothing but homomorphic encryptions of the client's input, which typically reveal nothing. The client learns, in addition to its output, the value which reveals nothing since $r_i$ is chosen at random.

Referring again to step 40 in the method of FIG. 1B, it is desired to implement a system computing this protocol in near real-time, so that face identification can be performed quickly enough to let the system operators take suitable steps if a suspect is found. It is therefore desirable to minimize as much as possible the online overhead of the system since any improvement by a constant factor can be of great importance in practice. Various optional overhead minimizations and optimizations are now described:

a. Oblivious transfer. In analyzing the overhead of the oblivious transfer it turns out that it is possible to move most of the computation and communication overhead of the OT to a preprocessing stage. A 1-out-of-$d_{max}+1$ OT protocol can be implemented using log $(d_{max}+1)$ invocations of 1-out-of-2 OT [29] e.g. 8 invocations of 1-out-of-2 OT since $d_{max}=180$. Moreover, as described herein, the public-key operations of the OT can be pre-computed before the inputs are known. The online phase requires sending symmetric encryptions of the sender's inputs. In the $F_{threshold}$ protocol of FIGS. 3A-3B, the sender's inputs $X_i$ are single bits. Therefore the online step of the OT comprises sending a (log $d_{max}$)-bit long offset from the receiver to the sender, and a string of $d_{max}=180$ bits from the sender to the receiver.

b. Homomorphic operations. Typically, the main online computational overhead is thus that of computing the homomorphic operations which are required for computing the Hamming distance. In experiments, it was found that homomorphic encryption takes about 38 msec, addition takes less than 1 msec, while subtraction takes about 62 msec. Computing a subtraction of homomorphic encryptions is costly, as it requires computing the additive inverse. These results used a certain implementation in Java, as is detailed herein with reference to step 70 of FIG. 1B, but most implementations will have the same ratio between the performance of the different operations. It is therefore beneficial to minimize the number of subtraction operations that are employed.

Consider the computation of the Hamming distance of w and $w^i$. For each bit location j, the server adds $E(w_j)$ to the sum, if its own bit $w^i_j$ is 0, or add to the sum the value $(1-E(w_j))$ if its own bit $w^i_j$ is 1. The computation is expected to perform l additions and ½ subtraction operations. The server can improve the overhead by separately computing the values $E(s_0)=\Sigma^i_{w^i_j=0}E(w_j)$, and $E(s_1)=\Sigma^i_{w^i_j=1}E(w_j)$. Also use $n_1$ to denote the number of bits in $w^i$ which are equal to 1. Then the encryption of the Hamming distance can be computed as $E(s_0)-E(s_1)+E(n_1)$. The computation according to this method requires l homomorphic addition and only a single subtraction per database item.

c. Reducing online communication, According to a basic protocol the client sends a homomorphic encryption of each of the l=900 bits of the face representation that it has, The length of a Paillier encryption is typically at least 2048 bits, and may be more than 3000 bits if reasonable security is required. These encryptions are sent after the client receives its input. It is possible, however, to send these encryptions in a preprocessing stage, thus reducing the online communication overhead. In order to do this, the client chooses a random 1 bit binary string and sends the encryptions of these bites to the server in the preprocessing stage. Later, when the client receives its input, it sends the 1 bit string $w_0 \oplus v_0, \ldots, w_{l-1} \oplus v_{l-1}$ to the server. The server modifies its operation in Step 150 of FIGS. 3A-3B according to the correction bit $v_j \oplus w_j$ that it received. Namely, instead of using its bit $w^i_j$ to decide what operation to apply to the homomorphic encryption $E(w_j)$, it uses the bit $w^i_j \oplus (w_j \oplus v_j)$ to decide which operation to apply to the encryption $E(v_j)$. The optimization listed above may also be modified to use $E(v_j)$ and $(w_j \oplus v_j)$ instead of $E(w_j)$, d. Further reducing the number of homomorphic operations. First assume that the optimization of the online communication, described above, is not used, and the server receives the encryptions $E(w_0), \ldots, E(w_1-1)$. Consider the ith item in the server's database and examine pairs of the bits of its representation. If $[w^i_0, w^i_1]=[0,0]$, then the value $E(w_0+w_1)$ is added by the server to the Hamming distance. If $[w^i_0, w^i_1]=[0,1]$, then the value $E(w_0+(1-w_1))$ is added to the Hamming distance, etc. Let the server first compute the four possible combinations $E(w_0+w_1)$, $E(w_0+1-w_1)$, $W(1-w_0+w_1)$ and $E(2-w_0-w_1)$. Then for each of the N items in the server's database it now only needs to perform a single addition operation, instead of two, in order to add the right value to the sum. The same method may also be applied when the optimization of online communication is used. In this case the server receives in the preprocessing phase the values $E(v_0), \ldots, E(v_{l-1})$, and precomputes the four possible combinations of each pair of successive bits. Then, after receiving the correction string, it can decide which of the four options are to be added to the sum.

In the preprocessing phase this method computes 7 homomorphic additions and 2 subtractions for each of the ½ pairs of input bits. The gain is in the online phase, where for each of the N database items the server needs to compute only ½ homomorphic additions instead of 1 addition. While experiments described herein only implemented this optimization with pairs of input bits, it can be extended to handle sets of three or more consecutive bits. By processing sets of three bits, for example, the overhead of the preprocessing phase increases to 16/3·1 additions and 1 subtraction. The online overhead is reduced to ⅓ additional operations. The method typically computes different sums of the same set of homomorphic encryptions, and therefore the "Four Russians" method [3] can be used to further minimize the total number of additional operations.

e. Parallelizing the computation. After the server receives the homomorphic encryptions from the client, it runs, for each item in its database, a computation which is independent of the other elements in the database. It is therefore possible to parallelize the operation of the server such that each processor or core handles a different set of faces in the server's database.

f. Overall online overhead. The overall online overhead is minimal. Summarize the operations that may be performed after the client receives its input, in Step 140 of the method of FIGS. 3A-3B, the client sends 1 bits to the server. Then Steps 150-180 are repeated for every item in the server's database and can optionally be parallelized. In Step 150, the server performs ½ homomorphic additions. In Step 160 it sends to the client a single homomorphic encryption. In Step 170 the client computes a single decryption. In Step 180 the client sends a log $d_{max}$=8 bit offset to the server, and the server sends back 1 bits to the client.

Referring again to step 70 in the method of FIG. 1B, one way to convert the $F_{threshold}$ method described herein to one where the server, rather than the client, receives an output, is for the server to encrypt the values that the client learns in the final OT. Namely, with probability ½ the server keeps its inputs to the OT as before, and with probability ½ it decides to flip all inputs from 0 to 1, and vice versa. As a result the client learns nothing from its output in the OT. The client then is to send back its output to the server, which can decrypt it and learn the correct output value. This modified method includes adding an additional communication step. It is also possible to achieve the same effect without adding this step, in the following way: In the method where the client receives the result, i.e. the method of FIGS. 3A-3B, an OT is used in which the client is the receiver, to check if the value that the server receives in Step 170, $d_H+r_i$, is greater than the threshold $t_i$. To enable the server to receive the result, both parties invoke an OT protocol, but this time they switch their roles and the server is the receiver.

Figure 3C:
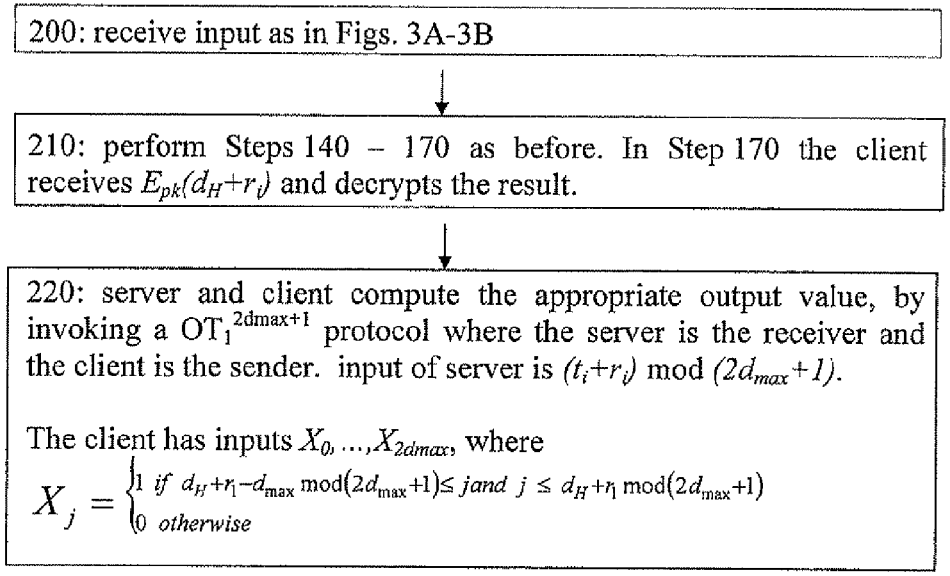
FIG. 3C is a simplified flowchart illustration of a second method for performing the secure face matching step in the method of FIG. 1B, not including security features, and characterized in that the output becomes known only to the server, all according to certain embodiments of the present invention.

This protocol is described in FIG. 3C which is a simplified flowchart illustration of a method in which a $F_{threshold}$ protocol allows the server of FIG. 1A to learn the output. The method of FIG. 3C differs from the method of FIGS. 3A-3B in that step 220 replaces step 180. Before the OT protocol begins, the client knows $d_H+r_i$, which is computed as in the previous protocol. The server knows $r_i$ and $t_i$. It is also known that $d_H, t_i \leq d_{max}$, and therefore $d_H - t_i$ is in the range $[-d_{max}, d_{max}]$. If $r_i=0$, the parties can run an OT where the server is the receiver and its input is $t_i$, and the client has $2d_{max}+1$ inputs, $X_{-dmax}, \ldots, X_{dmax}$ such that $X_i=0$ if $i \leq d_H$ and is equal to 1 otherwise. The server learns 1 if, and only if, $d_H-t_i<0$. Now, in actuality the value $r_i$ is random and is unknown to the client who knows only $d_H+r_i$. The parties can now check if $(d_H+r_i)-(t_-+r_i)<0$. The check can be done by reducing both values modulo $2d_{max}+1$, since it is known that $-d_{max} \leq (d_H+r_i)-(t_-+r_i) \leq d_{max}$. The server therefore uses the value $t_i+r_i \mod (2d_{max}+1)$ as its input in the OT. The client prepares $2d_{max}+1$ items, where:

$$X_{(dH+R-dmax) \mod 2dmax+1}, \ldots, X_{dH+R \mod 2dmax+1}=1$$
and
$$X_{dH+R+1 \mod 2dmax+1}, \ldots, X_{dH+R+dmax \mod 2dmax+1}=0.$$

As for efficiency, the server's input $t_i+r_i$, i.e. the sum of the threshold and a random value, is known to the server even in the preprocessing phase. Thus, in the preprocessing step of the OT the server can learn the exact keys that it needs in the online phase. This saves one round in the online stage, compared to the protocol where the client learns the output.

Computing $F_{min+t}$: Referring again to step 70 in the method of FIG. 1B, the $F_{min+t}$ functionality finds the item in the server's database whose distance from the client's input is minimal, as long as this distance is below the threshold. This functionality can be implemented in a rather straightforward manner using a generic method for secure computation, such as Yao's protocol. An optimized circuit for computing this functionality was described in [35].

A dSCiFI system, with m server machines, may be implemented by assigning to each server machine 900/m different bit locations in the representation of faces, and storing in it the corresponding bits for all images in the server's database. The following protocol is very efficient but leaks some information: Steps 140-170 of the protocol are identical to the steps of the basic $F_{threshold}$ protocol, and are run between the client and each of the server machines, where the client's input to the protocol invocation with the jth machine includes only the bits of the client's image which correspond to the bits assigned to that machine. Each machine j uses a different offset in the protocol. The client then sums the values that it decrypts in Step 170. Now, Step 180 of the protocol of FIGS. 3A-3B, where the OT is invoked, is run between the client and a single machine, say the first one. That machine knows the value $r_i = \Sigma_{i=1, \ldots, m} r_{i,j}$ and given that value it can correctly rotate its OT inputs. The value $r_i$ can be decided beforehand, and therefore no interaction between the server machines is required during the protocol. As for security, the protocol does not ensure that breaking into a subset of the machines does not reveal any information. Such an attack does reveal some information about the facial features, but it is believed that if not too many machines are compromised then only limited information about the faces is revealed. In addition, breaking into the first machine reveals $r_i = \Sigma_{i=1, \ldots, m} r_{i,j}$ and reduces the uncertainty about the values of the bits that were assigned to machines which were not compromised.

An alternative approach could have stored in each machine a share of 900 bits, such that the exclusive-or of all shares is equal to the image representation in the server's database. In that case, breaking into any subset of m−1 or less machines reveals no information about the image. The protocol, however, is less efficient since it requires a secure protocol which involves all server machines as well as the client typically using either a generic multi-party protocol, or a protocol tailored for this application. Therefore operation of all server machines is coordinated and synchronized, unlike in the previous protocol.

An example of a Real-Time Security System is now described. The proposed algorithms can be combined in different configurations depending on the application. An example of a security system for recognition of suspected individuals using a remote camera module installed in a public place is now described. As described above, the system typically comprises a server and a client. During a preprocessing phase, the server generates face representations of suspects, as described herein with reference to step 20, and converts them to binary vectors as described herein with reference to step 70. The individual thresholds are computed as described herein with reference to step 30. The binary representations and individual thresholds are stored in the server. The cryptographic protocol is initialized by the client, which sends encryptions of the bits of a random binary vector, and performs the preprocessing step of the OTs. The server computes the sum of consecutive pairs of bits, as is required by the optimized protocol.

The client obtains an image from a real-time face detection algorithm (e.g., [31, 43]), builds a binary face representation as described herein and sends homomorphic encryptions of its bits to the server. For each subject i in the database, the parties execute the $F_{threshold}$ cryptographic method. The output, which can be learnt by one or both of the parties, according to the variant of the protocol that is used, is a set of binary bits, one for every database entry. If all bits are equal to 0, which is the most likely case, since most of the people should not match the list of suspects, the client continues with the next image. If one or more of the bits are 1 then the operator of the system is notified.

As described herein with reference to step 70 of FIG. 1B, the system can be separated into a face recognition part and a secure computation part. The face recognition part generates representations of the faces in the server's database and of the face acquired by the client, and is run independently by each party. In the secure computation part the two parties jointly execute a secure protocol which checks if there is a match between the acquired face and the server's database.

Experiments were performed which examined the face recognition method used in SCiFI for accuracy. Then performance, i.e. latency, of the secure computation protocol was examined. The accuracy of the secure protocol is believed to output the correct answer with overwhelming probability.

Face Recognition Experiments were performed including tests to simulate a real security system that stores a list of subjects in the server and decides whether an input image obtained by a client matches one of the faces on the list. To determine a threshold on the set difference for each person an ensemble of people was constructed which included other individuals from the server's list and images of unrelated people which represent typical inputs to the system. Such can be easily obtained by a "dry run" of the camera before installing the recognition system. An individual threshold for the ith subject is set based on the smallest set difference between him and the rest of the people in the ensemble. A public set Y of faces was constructed from which the part vocabularies may be taken, by rendering images with frontal illumination using a sub-set of 34 3D models of faces supplied from the USF Human ID 3D Face Database, Courtesy of Prof. Sudeep Sarkar, University of South Florida, Tampa, Fla. The proposed face representation was tested on two benchmark databases, checking its robustness to various factors that influence the intra-user variation, and compared it to the Eigenvalue algorithm for which all images were pre-aligned and normalized for brightness.

Figure 4A:
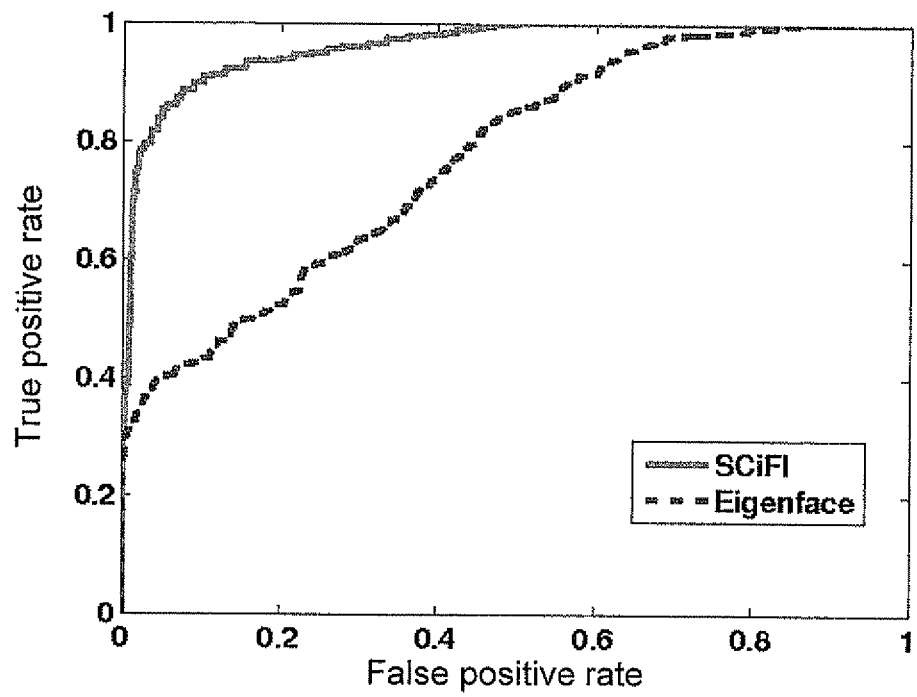
FIGS. 4A and 4B are graphs useful in understanding certain aspects of certain embodiments of the present invention.

Large illumination Variation: Robustness of the representation to large illumination changes was tested on the frontal pose subset of CMU-PIE database [38] that contains images of white, black, and Asian faces of males and females, in total 68 subjects under 43 illuminations. The server's list included 12 persons under frontal illumination. The client's set included a stream of 2912 images which is equivalent to an hour of video, with the processing rate of 1 image per sec, of 68 subjects, from which 504 belonged to the subjects from the server's list. All of the client's images contained faces in a frontal pose under large illumination changes, which make the face identification task much harder. About third of the subjects on the server's list wear glasses, but then remove them in half of the client's images. The results are shown in the graph of FIG. 4A in a form of a recognition rate plotted as a function of false positive rate. For example, the method may spot suspects in about 93% of images with 15% false alarms. This is dramatically better than the Eigenface performance, which is less than 50% recognition at this false alarm rate. This result was, however, expected, since Eigenface cannot generalize well to unseen conditions, such as changes in lighting and local occlusions such as glasses.

Figure 4B:
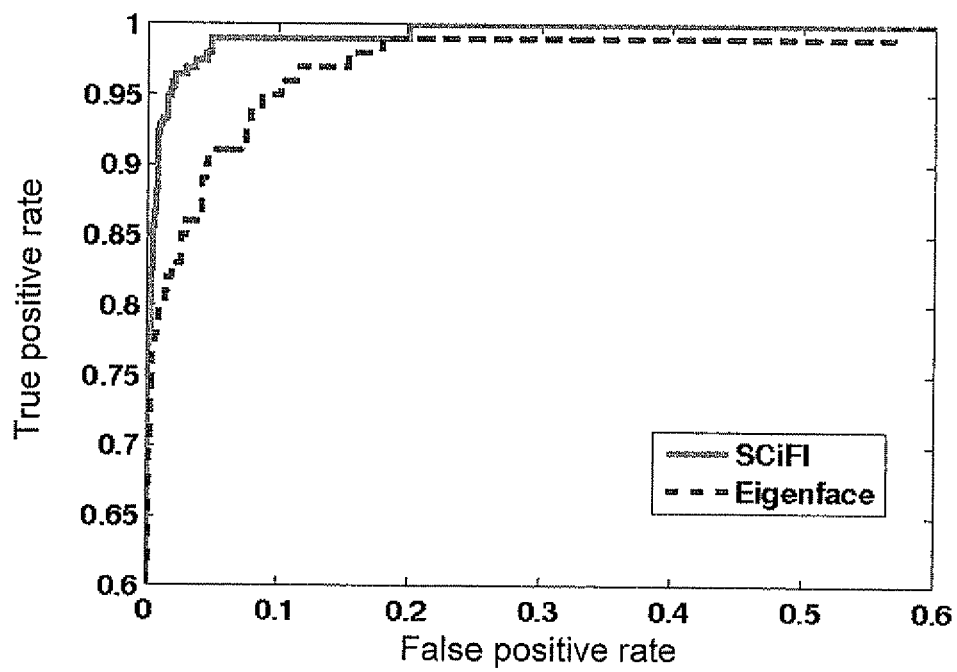

Near-frontal changes in pose, mild facial expressions and mild illumination changes: Although the current implementation of the system does not allow large variation in pose or facial expression, it can still handle some variation in these factors. To test the representation described herein in a more realistic setting, namely, near-frontal variation in pose and mild changes in facial expressions and illumination, the system described herein was run on the gallery and the fc probe set, i.e. set of test images, of the FERET [33] database. The probe set includes 194 images taken with a different camera and under different illumination than the images in the gallery set which includes 1196 subjects. Variations were present between the gallery set and the probe set. 100 subjects from the fc probe set formed the server's list, and all 1196 gallery images were used as a client's set. The graph of FIG. 4B shows the results of the method of certain embodiments, compared to the Eigenface, which again shows benefits of certain embodiments. For example, with a false alarm rate of 5%, the method of certain embodiments has 97% recognition success while Eigenface succeeds with probability of about 87%.

Robustness to illumination changes and partial occlusions: One of the advantages of using a part-based representation is its robustness to partial occlusions. Effects of partial occlusions in eye, nose and mouth areas were tested separately. To simulate occlusions a square area with size of 20% of the image width filled with random noise was used. Occlusion was applied to images obtained from the client and not to images in the server's list. The table of FIG. 5 summarizes the recognition results, tested on images of 68 people from the CMU-PIE database under 10 illuminations and partial occlusions. The right column of the table of FIG. 5 describes the number of patches with at least half of their area occluded. For example, hiding the nose hides 3 of the 30 patches, and results in recognition rate show almost no degradation (92.8% compared to 93% for 15% false positive rate). The graph of FIG. 4A is a graph of Illumination robustness test on CMU-PIE.

Secure Computation Experiments were performed as follows. A prototype of SCiFI was implemented in Java using Sun's JDK Homomorphic encryption was implemented using Paillier's algorithm, with a modulus N of length 1024 bits. The implementation was based on the Java implementation available on the World Wide Web at bricks.dk/~jurikdresearch.html. The implementation of OT12 was based on the Bellare-Miacli scheme and El Gamal encryption in a subgroup of order q of Zp*, where |p|=1024 and |q|=160. Symmetric encryption was done using ABS. The results are extremely fast, taking about 0.3 seconds to compare the vector representing the client's input with the vector representing an image in the server's database. It is also clear that an implementation in the C language, with a faster cryptographic library, would have resulted in a considerably better performance.

The experiments were performed on two Linux machines. The machines were located in two different buildings and communicated using sockets through TCP/IP over the local network. The Nagle algorithm was turned off in order to prevent the "ACK delay" and this indeed greatly improved the performance of the communication layer. The server machine was an 8 core machine of 2.6 GHz AMD Opteron processors and 1 GB of RAM. The client machine had a 2.8 GHz dual core Pentium D processor and 2 GB of RAM.

The protocol used in the SCiFI implementation is the $F_{threshold}$ protocol where the server learns the output as described herein. As described above, the computation comprises a preprocessing phase which is run before the client's input is known, and an online execution phase. It was desired to optimize the performance of the online phase. Specifically:

In the Client preprocessing phase, the client: (a) chooses a random vector of 900 bits and sends the encryption of these bits to the server, and (b) runs the preprocessing phase of the OT, e.g. as follows:

The majority of existing methods that address robustness to illumination variation take a holistic approach where an image of a face is represented as a Real vector in a high-dimensional space and the recognition is done on this vector, See [48] for the overview of these methods. Holistic methods are robust to illumination changes, but when some parts of a face are occluded, their recognition performance degrades significantly.

An alternative approach for face representation is based on the part-based paradigm, in which a face is represented by a collection of image fragments corresponding to different components of a face and their relative positions. Given a novel image, the recognition score is computed as a combination of recognition scores of every part in the representation and their geometric consistency. The robustness to viewing conditions is achieved by the use of robust image descriptors and by allowing some degree of deformation in the spatial configuration of parts. Part-based methods (e.g, [44, 23, 24, 5, 18, 49, 28, 27]) are more robust to occlusions, deformations, and local noises than the holistic methods. However, the reliance on real valued representations makes it hard to apply secure computation protocols, which are inherently based on finite fields. In the Server preprocessing phase, for every pair of consecutive bits sent by the client, i.e., $E(v_{2j}), E(v_{2j+1})$ the server precomputes the four possible values that can be added to the Hamming distance (depending on the value of the corresponding bits of the server), namely $E(v_{2j}+v_{2j+1}), E(v_{2j}+1-v_{2j+1}), E(1-v_{2j}+v_{2j+1})$ and $E(2-v_{2j}+v_{2j+1})$. This computation is performed only once and used for all images in the database. The server also runs the preprocessing phase of the OT. The server can choose its random input $r_i$ during the preprocessing phase, and then it knows at that stage the value of its input to the OT, namely the value $(r_i+t_i) \bmod (2d_{max}-1)$.

In the Client execution phase, after the client captures an image and computes its representative vector, it sends to the server a correction vector which is the exclusive-or between this vector and the random vector chosen by the client in the preprocessing phase. This is a string of 900 bits. Afterwards the client decrypts the result that the server sends, and both parties invoke the OT protocol where the client is the sender.

In the Server execution phase, after receiving the correction vector, the server computes the encryption of the Hamming distance between every image in the database and the client image. (The server can parallelize this step.) It then sends to the client an encryption of the sum of the Hamming distance and a random value. Afterwards it runs the OT protocol with the client and learns the final result. Experiments were performed in which the server stored a list of 100 face representations. Offline preprocessing at the client took about 213 sec. Of this time, 38 seconds were spent on preparing 900 homomorphic encryptions, 71 seconds were used to send these encryption to the server, and 92 seconds were spent on running the preprocessing phase of the 1-out-of-180 OT, which is used since $d_{max}$ was set at 180. As can be seen, almost half of the preprocessing time is spent on preparing and sending the homomorphic encryptions. As for the server, the offline preprocessing time of the server includes receiving the homomorphic encryptions (this time was already counted herein at the client side); summing every possible combination of each pair of consecutive bits, a step which takes about 57 sec; and running the preprocessing of the OT; this step was also already counted herein at the client side.

The previous preprocessing steps optimized the performance tremendously, and the resulting online execution time was minor for each image. The online execution time of the server for an image after receiving the correction binary vector is only about 0.3 seconds. This time includes:

(a) Computing the Hamming distance for the image, adding to it a random value and sending the result to the client; these steps require 0.28 sec; and (b) Running the online step of the OT protocol, where the server learns the result, this step takes 0.012 sec.

The run time is linear in the size of the server's database. The total online time for comparing the client's input to 100 database images in only 31 seconds. The bulk of the server's computation can be fully parallelized, and therefore using, e.g., six processors, reduces the processing time to about 5 seconds.

Figure 8:
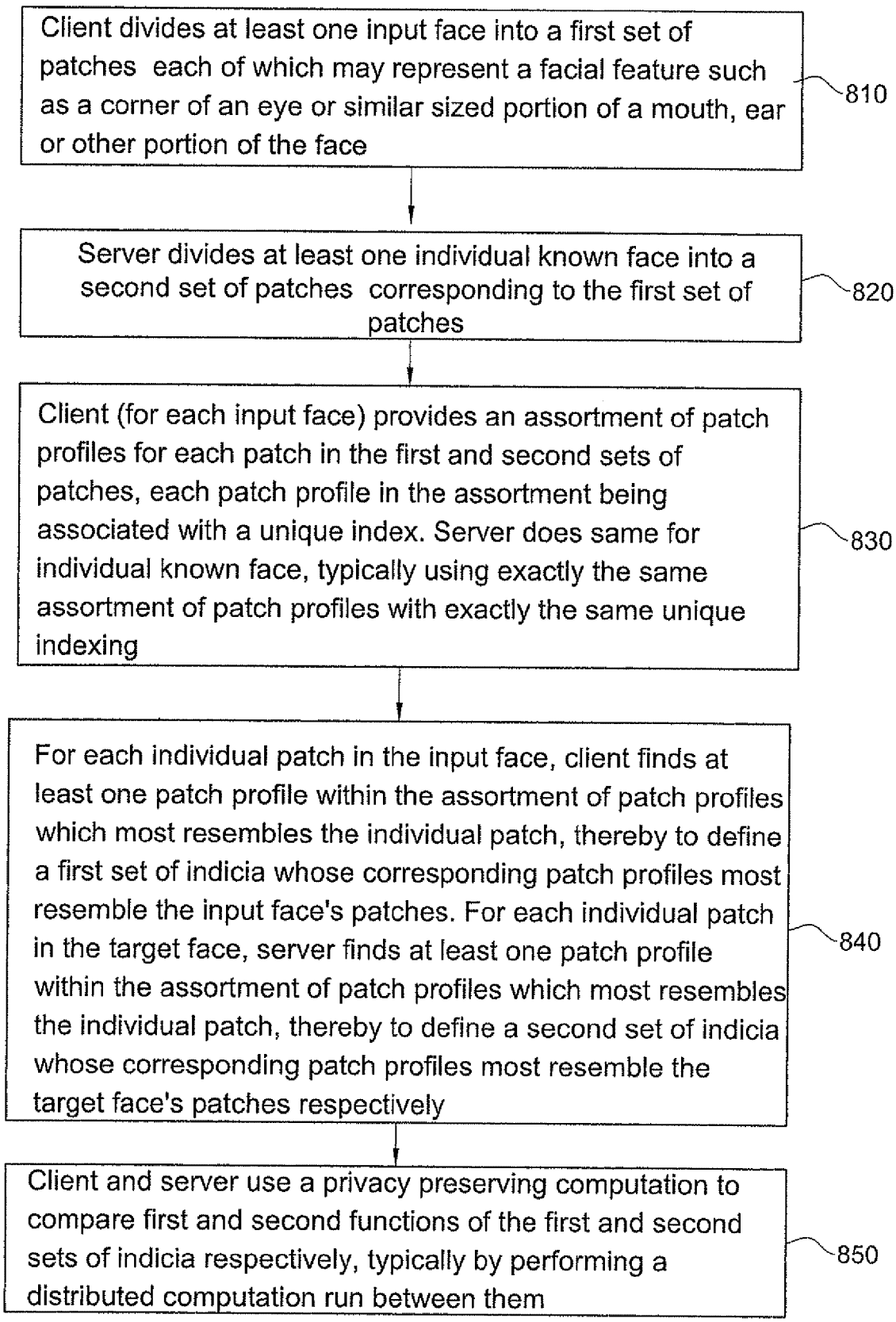
FIG. 8 is simplified flowchart illustration of a secure face identification method according to certain embodiments of the present invention.

One embodiment of a secure face identification method according to certain embodiments of the present invention is described in FIG. 8. The method of FIG. 8 typically includes some or all of the following steps, suitably ordered e.g. as shown:

In Step 810, the client divides at least one input face into a first set of patches each of which may represent a facial feature such as a corner of an eye or similar sized portion of a mouth, ear or other portion of the face.

In Step 820, the server divides at least one individual known face into a second set of patches corresponding to the first set of patches.

In Step 830, for each input face, the client provides an assortment of patch profiles for each patch in the first and second sets of patches, each patch profile in the assortment being associated with a unique index. The server does the same for an individual known face, typically using exactly the same assortment of patch profiles with exactly the same unique indexing.

In Step 840, for each individual patch in the input face, client finds at least one patch profile within the assortment of patch profiles which most resembles said individual patch, thereby to define a first set of indices whose corresponding patch profiles most resemble said input face's patches respectively and a second set of indices whose corresponding patch profiles most resemble said target face's patches respectively. Server does the same for each individual patch in each individual known face.

For example, each face may be divided into p=30 face patches. Each patch may be compared to a vocabulary of 20 known values regarding that patch which typically comprise 20 possible values for that patch which tend to span the entire universe of possibilities for that patch. Typically, a point of reference such as a location at the center of the face is computed and the distance of each patch from that point of reference is computed and used. Typically, this distance is quantized to one of, say, 10 options.

Typically, for each patch, 4 of the 20 known values of this patch are selected as being the most similar to the patch on the face currently being analyzed, and 2 quantized distances from the face-center are selected which are closest to the distance actually measured on the face being analyzed. In summary, according to this example, each face to be analyzed is provided with:

a. an appearance component including p=30 sets, where each set contains n=4 words out of N=20 options; and b. a spatial component including p=30 sets of z=2 words out of Q=10 options.

It is appreciated that the various numerical parameters above are merely by way of example and are not intended to be limiting.

In Step 850, client and server use a privacy preserving computation to compare first and second functions of said first and second sets of indices respectively, typically by performing a distributed computation run between them. It is appreciated that as described in detail herein, the face-patch resemblance information typically is not sent between the client and the server in the clear. Instead, a function of this information is sent, which is sufficient for the privacy preserving computation of step 850 but is not sufficient to reconstruct the original face-patch resemblance information e.g. is not sufficient to determine the 4 (say) patch profiles which a particular portion of a particular face most resembles. Typically, the function sent cannot even be used to learn any partial information about the original face-patch resemblance information.

A particular advantage of certain embodiments of the present invention is that the information packages exchanged between the client and server is inherently discrete (indices or discrete functions thereof) such that a secure cryptographic protocol can be used to compare those information packages, whereas continuous data (patch profiles) is used to characterize the faces such that the representation of the faces is not over-simplified.

The term "Privacy preserving computation" as used herein refers to a computation or protocol running between two (or more) parties which have private inputs x and y respectively. A function $F(x,y)$ is public. The privacy preserving computation computes F without revealing even partial information, other than F, regarding x to the second party or even partial information, other than F, regarding y to the first party.

It is appreciated that the methods and systems shown herein have a wide variety of applications such as but not limited to the following:

a. Real-Time Security System—a security system for recognition of suspected individuals using a remote camera module installed in a public place. During the preprocessing phase, the server generates face representations of suspects, converts them into binary vectors, and computes the corresponding individual thresholds. The binary representations and individual thresholds are stored in the server. The cryptographic protocol is initialized by the client, which sends encryptions of the bits of a random binary vector, and performs the preprocessing step of the OTs. The server computes the sum of consecutive pairs of bits, as is required by the optimized protocol.

The client obtains an image from a conventional real-time face detection algorithm, builds a binary face representation and sends homomorphic encryptions of its bits to the server. For each subject i in the database, the parties execute the $F_{threshold}$ cryptographic method. The output, which can be learnt by one or both of the parties, according to the variant of the protocol that is used, is a set of binary bits, one for every database entry. A bit equal to 1 signals that the image obtained by the client matches to an image in the server's database. If all bits are equal to 0 (which is the most likely case, since most of the people should not match the list of suspects), the client continues with the next image. If one or more of the bits are 1, then the operator of the system is notified.

b. Access control in uncontrolled viewing conditions, e.g.:

(i) Access to a controlled area (such as an operation room or a military command room): The door control unit stores a list of representations of faces of persons authorized to enter the controlled area. A camera unit obtains images of persons approaching the controlled area. If a person is identified as an authorized personnel, the doors are opened automatically without touching any buttons which allows fast access and, in the case of an operation room, doesn't damage sterilization; and (ii) Preventing of "piggy-backing": Using cards for access control does not solve the problem that more than one person enters the room with a single card. On the other hand, if several authorized persons need to enter the controlled area, it is inconvenient to require all of them to swipe their cards at the door. The system shown and described herein may not open the door if one of the people by the door is not identified by the system.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

Features of the present invention which are described in the context of separate embodiments may also be provided in combination in a single embodiment. Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A method for privacy-retaining face identification comprising:
   dividing at least one input face into a first set of patches;
   providing an assortment of patch profiles for each patch in said first set of patches, each patch profile in said assortment being associated with a unique index thereby to define an assortment of unique indices;
   for each individual patch in the input face, finding at least one patch profile within said assortment of patch profiles which most resembles said individual patch, thereby to define a first set of indices from among said assortment of unique indices whose corresponding patch profiles most resemble said input face's patches respectively; and
   using a privacy preserving computation to generate a physical output indicative of a comparison of said input face and at least one target face by comparing first and second functions of said first set of indices and of a second set of indices respectively, said second set of indices corresponding to patch profiles which most resemble a second set of patches into which said target face has been divided.

2. A method according to claim 1 and also comprising performing the following:
   dividing at least one target face into a second set of patches; and
   for each individual patch in the target face, finding at least one patch profile within said assortment of patch profiles which most resembles said individual patch, thereby to define the second set of indices from among said assortment of unique indices whose corresponding patch profiles most resemble said target face's patches respectively.

3. A method according to claim 2 wherein a server processor having a library of at least one target face to be identified divides said target face into said second set of patches and defines said second set of indices and a client processor divides said input face into said second set of patches and defines said second set of indices.

4. A method according to claim 3 wherein said assortment of patch profiles for each patch in said first and second sets of patches comprises a public database available to said server processor and to said client processor.

5. A method according to claim 3 wherein said using includes performing said privacy preserving computation without conveying any information regarding said input face, other than a function of said first set of indices, from said client processor to said server processor.

6. A method according to claim 3 wherein said using includes performing said privacy preserving computation without conveying any information regarding said input face, other than a function of said second set of indices, from said server processor to said client processor.

7. A method according to claim 3 wherein only one of said server processor and said client processor learns whether or not said at least one input face matches said at least one target face.

8. A method according to claim 1 wherein said respective functions comprise binary strings generated from said first and second sets of indices respectively and wherein a Hamming distance is used to compare said binary strings.

9. A method according to claim 1 wherein said assortment of patch profiles comprises a finite assortment.

10. A method according to claim 1 and also comprising computing a first binary string representing said first set of indices which includes a "1" at each position within said binary string which corresponds to an index in said first set of indices and a "0" at each position within said binary string which does not correspond to any index in said first set of indices.

11. A method according to claim 10 wherein said function of said first set of indices comprise a homomorphic encryption of said first binary string.

12. A method according to claim 1 also comprising computing a second binary string representing said second set of indices which includes a "1" at each position within said second binary string which corresponds to an index in said second set of indices and a "0" at each position within said second binary string which does not correspond to any index in said second set of indices.

13. A method according to claim 12 wherein said function of said second set of indices comprise a homomorphic encryption of said second binary string.

14. A method according to claim 1 wherein said using of said privacy preserving computation comprises determining similarity between said first and second functions of said first and second sets of indices respectively at least partly based on a determination of whether the number of individual bit differences in at least respective portions of respective binary strings representing said functions is less than a certain threshold.

15. A method according to claim 1 wherein said finding of at least one patch profile does not divulge any information other than whether or not the input face matches said target face.

16. A method according to claim 1 which determines whether said at least one input face matches said at least one target face without divulging the input face to the server and without divulging the target face to the client.

17. A method according to claim 1 also comprising computing at least one binary string representing at least one set of indices from among said first and second sets of indices, whose binary string includes a "1" at each position within said binary string which corresponds to an index in said at least one set of indices and a "0" at each position within said binary string which does not correspond to any index in said at least one set of indices.

18. A method according to claim 1 wherein said physical output comprises a command affecting access to a restricted area.

19. A method according to claim 1 wherein said physical output comprises an output on a computerized display.

20. A method according to claim 1 and also comprising imaging a human's face to obtain a computerized representation of at least one face.

21. A method according to claim 1 wherein said first and second functions both comprise the unity function such that said privacy preserving computation compares said first set of indices to said second set of indices.

22. A system for privacy-retaining face identification operative in association with a server side having a library of at least one target face to be identified and a client side having at least one input face whose resemblance to said at least one target face is to be determined, the system including:
    at least one face patcher dividing the input face into a first set of patches and dividing the target face into a second set of patches;
    a database including an assortment of patch profiles for each patch in said first and second sets of patches, each patch profile in said assortment being associated with a unique index thereby to define an assortment of unique indices;
    a discrete face analyzer finding, for each individual patch in the input face and in the target face, at least one patch profile within said assortment of patch profiles which most resembles said individual patch, thereby to define a first set of indices from among said assortment of unique indices whose corresponding patch profiles most resemble said input face's patches respectively and a second set of indices whose corresponding patch profiles most resemble said target face's patches respectively; and
    a privacy preserving computation machine operative to compare first and second functions of said first and second sets of indices respectively.

23. A computer program product, comprising a computer readable medium excluding intangible transitory media such as signals and carrier waves and having a computer readable program code embodied therein, said computer readable program code adapted to be executed to implement a method for privacy-retaining face identification comprising:
    dividing at least one input face into a first set of patches;
    providing an assortment of patch profiles for each patch in said first set of patches, each patch profile in said assortment being associated with a unique index thereby to define an assortment of unique indices;
    for each individual patch in the input face, finding at least one patch profile within said assortment of patch profiles which most resembles said individual patch, thereby to define a first set of indices from among said assortment of unique indices whose corresponding patch profiles most resemble said input face's patches respectively; and
    using a privacy preserving computation to generate a physical output indicative of a comparison of said input face and at least one target face by comparing first and second functions of said first set of indices and of a second set of indices respectively, said second set of indices corresponding to patch profiles which most resemble a second set of patches into which said target face has been divided.

\* \* \* \* \*